(12) United States Patent
Kim et al.

(10) Patent No.: US 11,731,312 B2
(45) Date of Patent: Aug. 22, 2023

(54) CASTING APPARATUS, CAST ZIRCONIA CERAMIC BODIES AND METHODS FOR MAKING THE SAME

(71) Applicant: James R. Glidewell Dental Ceramics, Inc., Newport Beach, CA (US)

(72) Inventors: Dongkyu Kim, Irvine, CA (US); Sai Sumant Kalidindi, Irvine, CA (US)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 192 days.

(21) Appl. No.: 17/160,681

(22) Filed: Jan. 28, 2021

(65) Prior Publication Data
US 2021/0229314 A1 Jul. 29, 2021

Related U.S. Application Data

(60) Provisional application No. 62/967,192, filed on Jan. 29, 2020.

(51) Int. Cl.
*B28B 1/00* (2006.01)
*B28B 1/26* (2006.01)

(52) U.S. Cl.
CPC ............ *B28B 1/265* (2013.01); *B28B 1/261* (2013.01)

(58) Field of Classification Search
CPC ............................... B28B 1/265; B28B 1/261
See application file for complete search history.

(56) References Cited

U.S. PATENT DOCUMENTS

| 399,064 | A | * | 3/1889 | McLean |
| 3,111,396 | A | | 11/1963 | Ball |
| 3,523,916 | A | | 8/1970 | Needham et al. |
| 3,837,825 | A | | 9/1974 | Loxley et al. |
| 4,431,420 | A | | 2/1984 | Adair |
| 4,556,530 | A | | 12/1985 | van der Scheer |
| 4,769,349 | A | | 9/1988 | Hillig et al. |
| 4,772,436 | A | | 9/1988 | Tyszblat |
| 4,828,495 | A | | 5/1989 | Bell et al. |
| 4,906,424 | A | | 3/1990 | Hughes et al. |
| 4,983,182 | A | | 1/1991 | Kijima et al. |

(Continued)

FOREIGN PATENT DOCUMENTS

| CN | 1215711 A | 8/2005 |
| CN | 1236761 | 1/2006 |

(Continued)

OTHER PUBLICATIONS

Written opinion of the International Searching Authority for PCT/US2008/012489, dated Dec. 31, 2008, in 4 pages.

(Continued)

*Primary Examiner* — Nicholas R Krasnow
(74) *Attorney, Agent, or Firm* — Charles Fowler

(57) ABSTRACT

Methods and apparatus are provided for increasing the rate of casting ceramic bodies from a slurry or suspension. Methods and apparatus are successfully used for casting ceramic bodies from micron-sized zirconia ceramic at an accelerated rate. Methods described herein may also be used for casting ceramic bodies from nano-sized zirconia ceramic. The casting apparatus may be configured for use in a plurality of operational modes. Ceramic bodies produced by the methods and apparatus are suitable for use in dental applications.

22 Claims, 11 Drawing Sheets

(56) References Cited

U.S. PATENT DOCUMENTS

| | | | |
|---|---|---|---|
| 5,156,856 A * | 10/1992 | Iwasaki | B28B 1/265 425/84 |
| 5,185,177 A | 2/1993 | Kijima et al. | |
| 5,192,325 A | 3/1993 | Kijima et al. | |
| 5,203,936 A | 4/1993 | Dolhert et al. | |
| 5,256,609 A | 10/1993 | Dolhert | |
| 5,296,175 A | 3/1994 | Iwaski et al. | |
| 5,342,564 A | 8/1994 | Wei et al. | |
| 5,372,178 A | 12/1994 | Clarr et al. | |
| 5,395,437 A | 3/1995 | Chiou | |
| 5,441,408 A | 8/1995 | Moschik | |
| 5,443,770 A | 8/1995 | Krstic et al. | |
| 5,660,863 A * | 8/1997 | Nakano | C04B 35/82 425/85 |
| 5,672,055 A | 9/1997 | Koutavas | |
| 5,776,382 A | 7/1998 | Kim et al. | |
| 5,785,911 A | 7/1998 | Willkens et al. | |
| 5,788,891 A | 8/1998 | Gauckler et al. | |
| 5,843,348 A | 12/1998 | Giordano | |
| 5,849,068 A | 12/1998 | Hofmann, geb. Roth et al. | |
| 5,975,905 A | 11/1999 | Kim et al. | |
| 6,007,926 A | 12/1999 | Provenzano et al. | |
| 6,180,034 B1 | 1/2001 | Buck et al. | |
| 6,200,526 B1 | 3/2001 | Fox et al. | |
| 6,291,378 B1 | 9/2001 | Evans et al. | |
| 6,431,800 B1 | 8/2002 | Suzuki | |
| 6,814,917 B1 | 11/2004 | Watanabe et al. | |
| 6,878,456 B2 | 4/2005 | Castro et al. | |
| 6,896,846 B1 | 5/2005 | Varma et al. | |
| 6,946,013 B2 | 9/2005 | Alward et al. | |
| 7,271,100 B2 | 9/2007 | Lee et al. | |
| 7,655,586 B1 | 2/2010 | Brodkin et al. | |
| 8,178,012 B1 | 5/2012 | Khan et al. | |
| 8,196,755 B2 | 6/2012 | Diefenbacher et al. | |
| 8,268,230 B2 | 9/2012 | Cherepy et al. | |
| 8,572,484 B2 | 10/2013 | Maruyama et al. | |
| 8,785,518 B2 | 7/2014 | Suh et al. | |
| 8,813,364 B2 | 8/2014 | Schechner et al. | |
| 9,039,947 B2 | 5/2015 | Jahns et al. | |
| 9,193,630 B2 | 11/2015 | Bocciarelli et al. | |
| 9,309,155 B2 | 4/2016 | Nahas | |
| 9,434,651 B2 | 9/2016 | Carden | |
| 9,790,125 B2 | 10/2017 | Beall et al. | |
| 9,790,129 B2 | 10/2017 | Carden | |
| 9,925,126 B2 | 3/2018 | Kolb et al. | |
| 2001/0048969 A1 | 12/2001 | Constantino et al. | |
| 2002/0037800 A1 | 3/2002 | Yang | |
| 2002/0155412 A1 | 10/2002 | Panzera et al. | |
| 2003/0096214 A1 | 5/2003 | Luthardt et al. | |
| 2004/0119180 A1 | 6/2004 | Frank et al. | |
| 2005/0023710 A1 | 2/2005 | Brodkin et al. | |
| 2005/0203231 A1 | 9/2005 | Halpert et al. | |
| 2006/0014390 A1 | 1/2006 | Lee et al. | |
| 2007/0056467 A1 | 3/2007 | Panzera | |
| 2007/0134496 A1 | 6/2007 | Katagiri et al. | |
| 2008/0085828 A1 | 4/2008 | Khan et al. | |
| 2008/0164402 A1 | 7/2008 | Menke et al. | |
| 2008/0258358 A1 | 10/2008 | Oswald et al. | |
| 2009/0098365 A1 | 4/2009 | Moeltgen | |
| 2009/0115084 A1 | 5/2009 | Moon | |
| 2009/0220787 A1 | 9/2009 | Granger et al. | |
| 2009/0291011 A1 | 11/2009 | Zhang et al. | |
| 2009/0321971 A1 | 12/2009 | Brodkin et al. | |
| 2010/0003157 A1 | 1/2010 | Scholl et al. | |
| 2010/0249305 A1 | 9/2010 | Laubersheimer et al. | |
| 2011/0236860 A1 | 9/2011 | Jahns et al. | |
| 2011/0260349 A1 | 10/2011 | Rolf et al. | |
| 2012/0193823 A1 | 8/2012 | Goetzinger et al. | |
| 2013/0224454 A1 | 8/2013 | Jung et al. | |
| 2013/0224688 A1 | 8/2013 | Mayr et al. | |
| 2013/0313738 A1 | 11/2013 | Carden | |
| 2013/0341812 A1 | 12/2013 | Schechner et al. | |
| 2014/0008826 A1 | 1/2014 | Dierkes et al. | |
| 2018/0170812 A1 | 6/2018 | Xu et al. | |

FOREIGN PATENT DOCUMENTS

| | | |
|---|---|---|
| DE | 1471423 A | 7/1963 |
| EP | 0329284 B1 | 8/1989 |
| EP | 0587160 A1 | 3/1994 |
| JP | 411019910 A | 1/1999 |
| WO | 2006024098 A1 | 3/2006 |
| WO | 2007000310 A1 | 1/2007 |
| WO | 2009061410 A1 | 5/2009 |
| WO | 2013181018 A2 | 12/2013 |

OTHER PUBLICATIONS

International Search report in International Application No. PCT/US2013/041941 dated Oct. 24, 2013.
U.S.P.T.O Non-final Office Action issued in U.S. Appl. No. 12/290,089 dated Jun. 2, 2009.
U.S.P.T.O Non-final Office Action issued in U.S. Appl. No. 12/290,089 dated Dec. 1, 2009.
International Search Report issued in Application No. PCTUS2008/12489 dated Dec. 31, 2008.
Non-Final Office Action issued in U.S. Appl. No. 13/481,810 dated Jan. 15, 2016.
Final Office Action issued in U.S. Appl. No. 13/481,810 dated Sep. 22, 2015.
Non-Final Office Action issued in U.S. Appl. No. 13/481,810 dated Mar. 12, 2015.
Non-Final Office Action issued in U.S. Appl. No. 13/481,810 dated Aug. 22, 2014.
International Supplementary Search Report issued for PCT/US2008/012489, dated Feb. 16, 2018, in 10 pages.

* cited by examiner

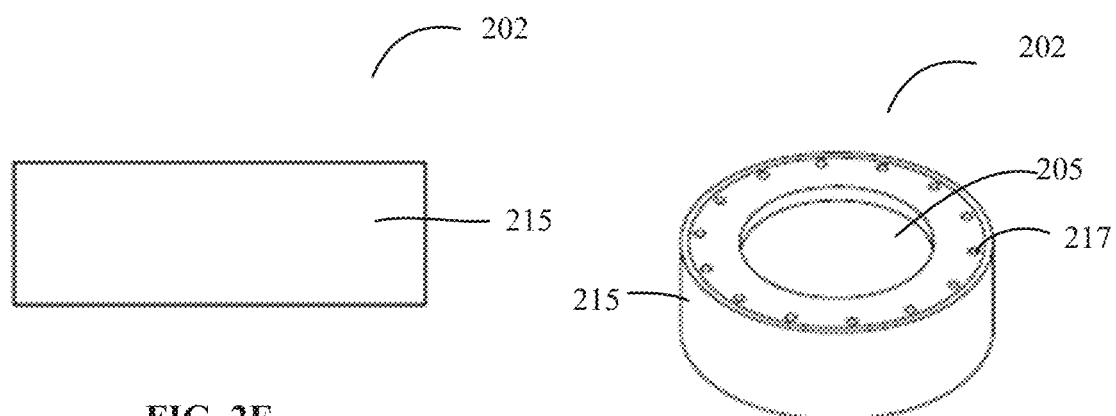
FIG. 2F
FIG. 2G
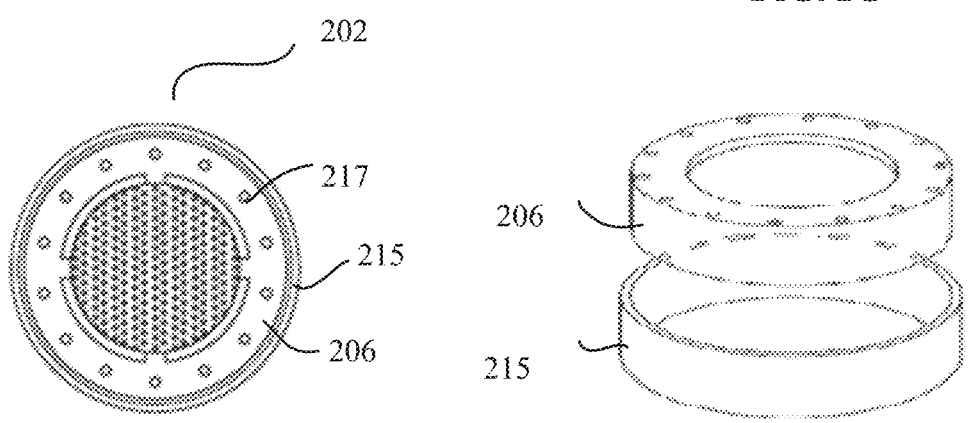
FIG. 2H
FIG. 2I

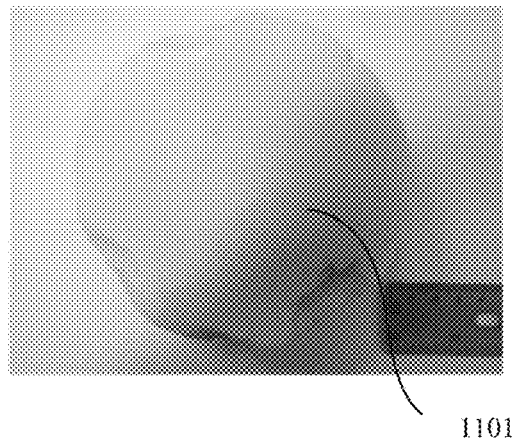
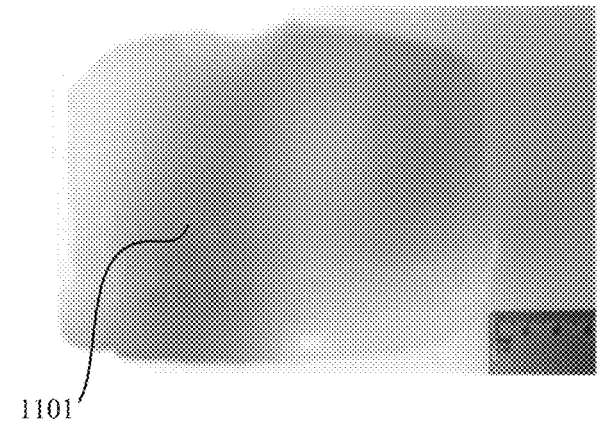
FIG. 11A                FIG. 11B
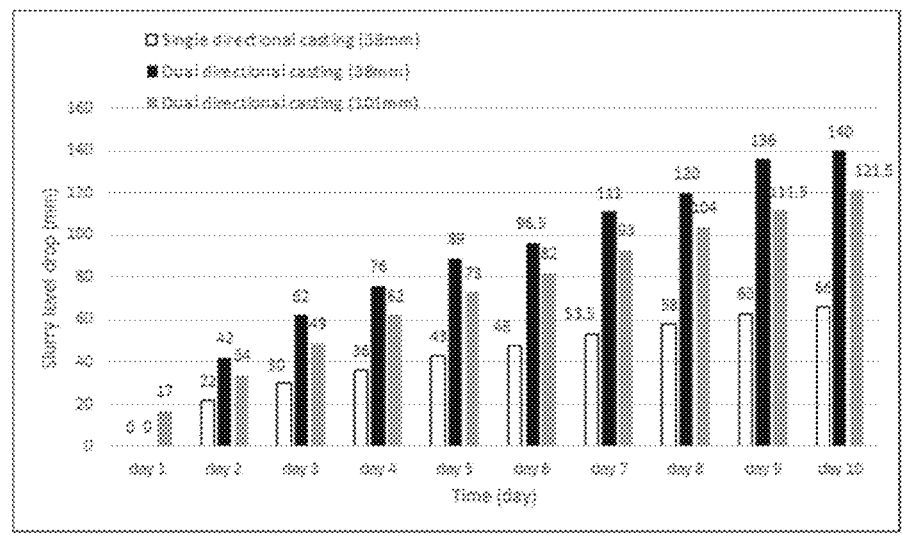
FIG. 12

CASTING APPARATUS, CAST ZIRCONIA CERAMIC BODIES AND METHODS FOR MAKING THE SAME

RELATED APPLICATIONS

This application claims the benefit of, and priority to, U.S. Provisional Patent Application No. 62/967,192, filed Jan. 29, 2020. The entirety of the foregoing application is incorporated herein by reference.

BACKGROUND

Methods for slip casting ceramic bodies in molds with the assistance of pressure and/or vacuum are known.

Commonly owned U.S. Pat. No. 9,790,125, incorporated herein by reference in its entirety, discloses a vacuum-assisted slip casting process, and vacuum-assisted slip casting assembly comprising a porous casting substrate surrounded by a removable enclosure, comprised of an impermeable materials, such as plastic, within which the ceramic blank forms.

EP 0 587 160 to Awazu discloses slip casting ceramics in a high strength mold made wholly or partially of porous metal or porous ceramic to carry out slip a casting process at higher pressure compared to conventional processes. The porous mold may have holes having a maximum diameter of the twenty times the diameter of the secondary particles of the powders in the slurry.

SUMMARY

Methods and apparatus are provided to cast ceramic bodies from a slurry or suspension of micron and nano-sized zirconia ceramic powder. An apparatus that is adaptable to a pressure casting process, a vacuum casting process, or simultaneous pressure and vacuum casting process, is provided. The apparatus is also adaptable for casting in a single direction (axial or radial) or dual direction (axial and radial), by removing, adding, or substituting components that selectively block the flow of a ceramic suspension during the casting process.

Through processes described herein, ceramic bodies may be cast from ceramic micron-sized powder at an accelerated rate. Further, ceramic bodies may be cast from a suspension of nano-sized zirconia powder having large dimensions not previously achieved.

A casting apparatus may comprise an upper casting assembly and a lower casting assembly. An upper casting assembly comprises a slurry chamber and a mold. The slurry chamber and mold may be one piece, such as a cylinder, optionally having a divider to separate the slurry chamber from the mold. A lower casting assembly comprises a casting substrate on which ceramic buildup occurs above a support body. The mold is in communication with the casting substrate of the lower casting assembly. A vacuum may be applied to the bottom of the support body of the lower casting assembly pulling the suspension in the axial direction, the radial direction, or both.

For single direction, axial casting, liquid from the ceramic suspension is evacuated through the casting substrate, and the suspension liquid is prevented from moving in the radial direction through vertical walls of the mold. In one embodiment of a single direction, axial casting process, the mold walls comprise impermeable material to prevent radial movement of liquid during the casting process.

In one embodiment of a single direction, radial casting process, the flow of liquid in the axial (z-axis) direction through the bottom of the mold adjacent the casting substrate may be inhibited or blocked. For example, vacuum pressure through the casting substrate may be blocked by use of a non-porous casting substrate, non-porous support body, or both, comprised of material that is impermeable to the flow of liquid and air during vacuum casting conditions. Alternatively, a sheet or body of blocking material that is impermeable to the vacuum, air, and slurry, may be placed between the vacuum source and a porous casting substrate.

For radial casting (either a single direction radial casting or dual direction axial-radial casting), the walls of the mold may comprise mold wall openings, such as through holes, that allow the flow of liquid from the suspension through the vertical sides of the mold. A porous vertical body may surround the outer surface of the mold wall opposite the mold cavity, filling or covering the mold wall openings. Liquid from the ceramic suspension is discharged from the mold cavity through the mold wall openings and into the porous vertical body. A casting substrate and support body may also be comprised of a porous material that is the same or different from the porous vertical body.

Casting speed during radial casting may be controlled by the size of the through holes in the mold wall. Through holes may be uniform in size and shape, or a mold wall may have multiple sized openings. The openings may be any shape such as circular, rectangular, diamond, and the like, having a width or diameter of, for example, about 0.1 mm to 15 mm. The through holes in the impermeable mold material may comprise up to 95% of the surface area of the walls of the mold cavity. The perimeter of the mold that contacts a casting substrate during a casting process may comprise a solid band of impermeable material with no through holes for a portion of the vertical wall height. In this embodiment, the mold wall is impermeable around the perimeter adjacent the casting substrate for a height of at least 1.0 mm when measured from the casting surface. In one embodiment, when assembled with a casting substrate, the solid band of the mold cavity fits within an indentation of the support body that restricts movement of the mold during the casting process.

Upper and lower casting assemblies may further comprise an impermeable upper case and lower case fitted around upper and lower casting assemblies to restrict the flow of air, vacuum, and liquid through the casting assemblies, and to maintain pressure within the casting apparatus. The upper case may surround the outside of the porous vertical body and the mold. In one embodiment, the upper casting assembly comprises a gap between the upper case and the porous vertical body. During a vacuum casting process, pressure is reduced in the gap adjacent the porous vertical body, and liquid is evacuated radially through openings in the mold wall, through the porous vertical body, and into the gap to be eliminated from the casting apparatus. Suspension liquid may be eliminated through channels in the lower casting body that align with the gap, and then, evacuated out of the casting apparatus.

The casting apparatus may be adaptable to pressure casting. In one embodiment, the slurry chamber and mold may be made of a material having sufficient strength to withstand the application of positive pressure during the pressure casting process, such as metal (e.g., aluminum). A metal lid may be provided to cover the slurry chamber, attaching to the slurry chamber by attachment means such as latches or screws extending through holes. The lid may comprise inlets for a hose or nozzle to deliver the ceramic suspension and for delivering pressurized gas to the mold cavity, and optionally, for placement of a pressure gauge and/or pressure-releasing valve.

In one embodiment, casting processes may result in uneven buildup of ceramic material, where ceramic buildup is higher adjacent the wall of the mold and lower in the center of the cast body. Thus, in a further embodiment, a separator, such as a ring, may be located at the top of the mold, between the mold and the slurry chamber to prevent excess ceramic buildup around the outer edge of the cast body beyond the height of the separator. The separator may be a permeable divider between the mold and the slurry chamber, or a solid, impermeable ring around the perimeter of the mold having a permeable center portion that allows ceramic suspension to be introduced through openings in the permeable separator. Openings through the thickness of the permeable separator may be uniformly distributed across its surface to provide vacuum or pressure uniformly distributed over the ceramic body during casting.

In one embodiment, a dual vacuum-pressure casting apparatus is provided that may be configured to operate in nine different modes: 1) axial direction under vacuum, 2) axial direction under positive pressure, 3) axial direction under vacuum and positive pressure, 4) radial direction under vacuum, 5) radial direction under positive pressure, 6) radial direction under vacuum and positive pressure, 7) radial and axial directions under vacuum, 8) radial and axial directions under positive pressure, and 9) radial and axial directions under vacuum and positive pressure.

Casting processes described herein significantly reduce casting time of ceramic bodies compared to known vacuum casting processes.

BRIEF DESCRIPTION OF THE FIGURES

FIGS. 2F through 2H are front, perspective and top-down views, respectively, of an embodiment of components of a lower casting assembly of a casting apparatus.

FIG. 2I is an exploded view of components of one embodiment of a lower casting assembly.

FIGS. 11A and 11B are photographic representations of a top and front view of a nano ceramic body cast by a process described herein.

FIGS. 12 and 13 are graphical representations of results of casting processes described herein.

DETAILED DESCRIPTION

Methods and apparatus are provided for slip casting ceramic bodies in a mold. The casting process may comprise a vacuum casting process, a pressure casting process, or both vacuum and pressure casting. Casting may be selectively unidirectional, in either the axial direction or radial direction_ or multi-directional in both axial and radial directions. A mold is provided that is adaptable to pressure casting or vacuum casting, in axial and/or radial directions. By processes described herein ceramic bodies may be cast from ceramic suspensions comprising zirconia nano-powder or micron-sized powder. The resulting cast ceramic bodies may be heated to form a pre-sintered (bisque) stage millable block, or fully sintered ceramic body. Solid ceramic bodies may be used as dental mill blocks that accommodate single or multi-unit restoration bodies, including, but not limited to crowns, veneers, bridges, dentures, and the like.

Figure 1:
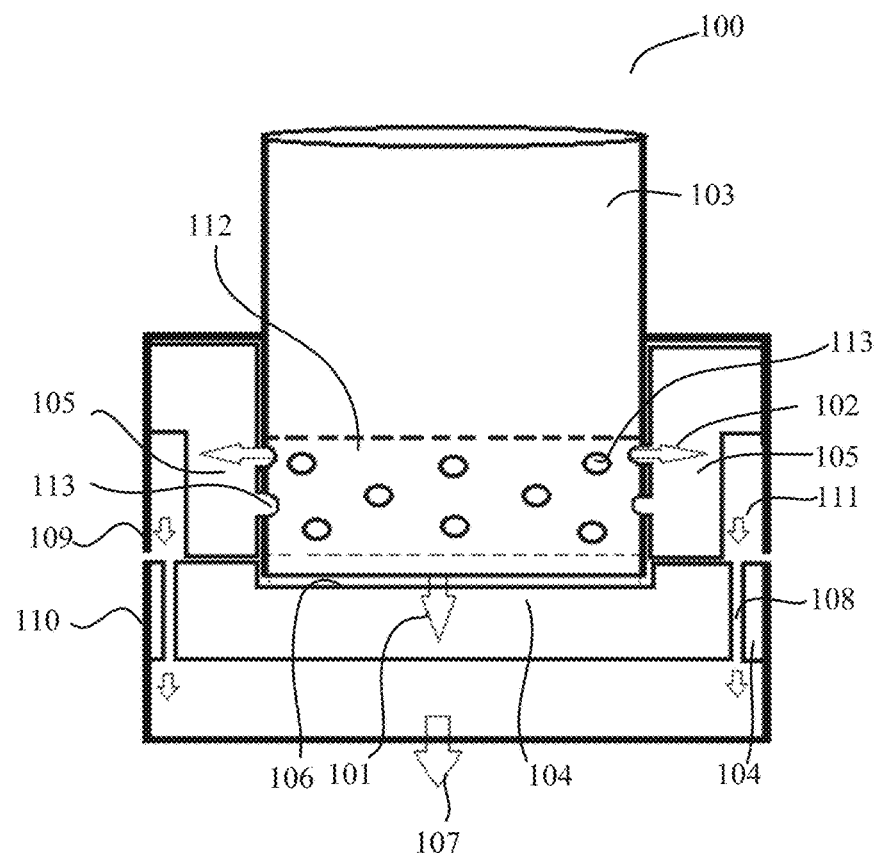
FIG. 1 is a cross-sectional illustration of a casting apparatus and process.

With reference to FIG. 1, a cross-sectional view of an adaptable casting apparatus 100 for casting in axial 101 and/or radial 102 directions is illustrated. Through processes described herein, ceramic bodies may be cast from liquid compositions comprising micron-sized powder at an accelerated rate. Further, ceramic bodies may be cast from a suspension of nano-sized zirconia powder having cast body dimensions not previously achieved. In a casting process, a ceramic casting suspension is introduced into a slurry chamber 103. In an axial casting process, liquid from the ceramic casting suspension is discharged axially 101 through a mold 112 in communication with the slurry chamber 103, and into a porous support body 104; ceramic particles build up on a casting substrate 106 as vacuum 107 is applied through a porous support body 104 below the casting substrate 106. In a radial casting process, liquid from the ceramic suspension is discharged radially 102 through holes 113 in mold walls 112 and into a porous vertical body 105 that surrounds the outer surface of the mold 112, and then removed from the casting apparatus through channels 108 in the support body 104.

Figure 2A:
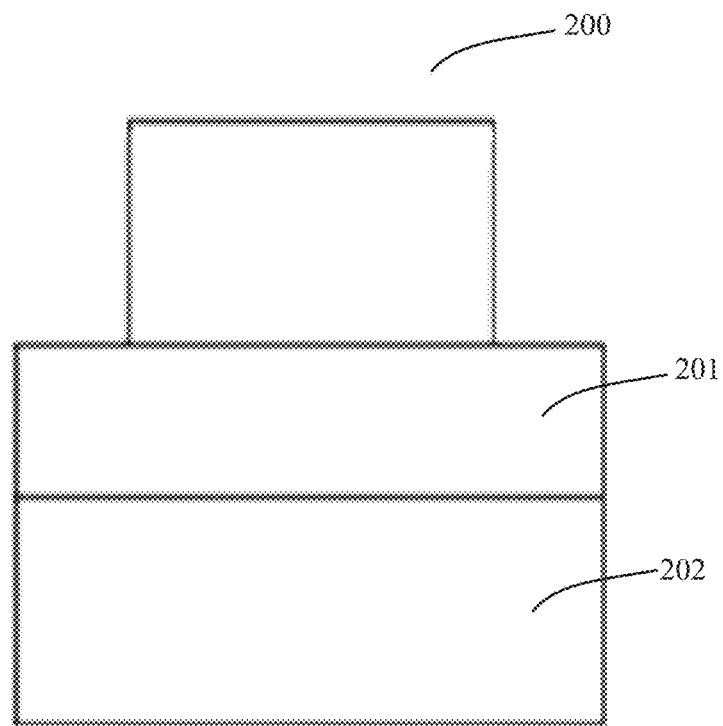
FIG. 2A is a front view of a casting apparatus.
Figure 2B:
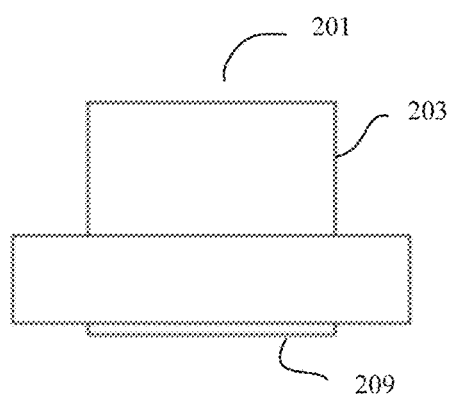
FIGS. 2B and 2C are illustrative views of an upper casting assembly.

In FIG. 2A a casting apparatus 200 is illustrated comprising an upper casting assembly 201 and a lower casting assembly 202. As illustrated in FIGS. 2B through 2E, an upper casting assembly 201 comprises a slurry chamber 203 and a mold 204. As illustrated in FIGS. 2F through 2I, a lower casting assembly 202 comprises a casting substrate 205 and support body 206 for supporting the mold and casting substrate.

The mold 204 comprises a mold cavity 207 having a first end 208 in communication with a slurry chamber 203 and a second end 209 in communication with casting substrate 205 when assembled with the lower casting assembly. A mold wall 210 that defines the mold cavity 207 is comprised of an impermeable material that is resistant to penetration of the liquid component of a ceramic suspension under casting vacuum and pressure. The impermeable material may be comprised of, for example, a polymer, metal or ceramic material. The thickness of the mold wall may be from 0.3 mm to 20 mm, or from 1 mm to 10 mm. The mold cavity comprises mold wall openings 211, or through holes, that extend through the thickness of the impermeable material of the mold wall 210.

Figure 2C:
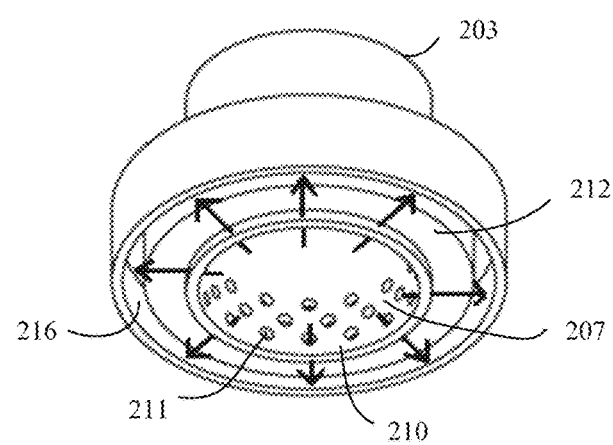
Figure 2D:
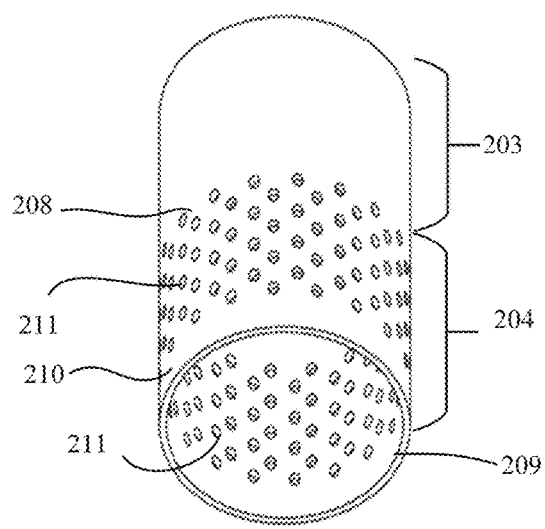
FIG. 2D is an embodiment of a slurry chamber and mold with openings through the mold wall.
Figure 2E:
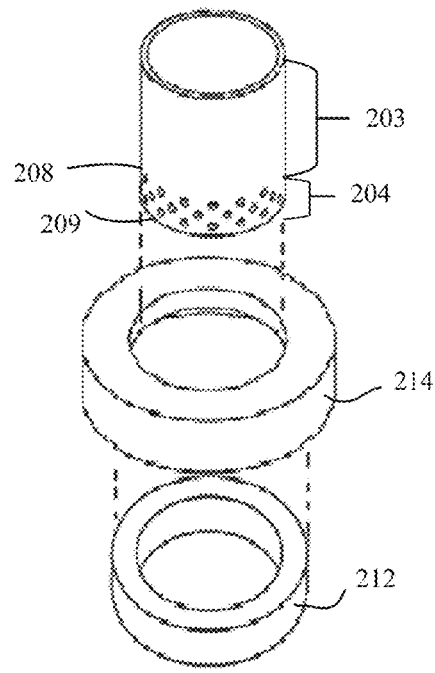
FIG. 2E is an exploded view of an illustration of components of an upper casting assembly.

As illustrated in FIG. 2C, a porous vertical body 212 surrounds the outer surface of the mold wall 210, opposite the mold cavity 207 covering the mold wall openings 211. The porous vertical body 212 is in communication with the mold cavity through the mold wall openings 211, and optionally, extends through the mold wall openings 211. Liquid and ceramic particles of a ceramic suspension are separated as the liquid component is discharged from the mold cavity through the wall openings 211 and into the porous vertical body 212. The lower casting assembly may comprise a porous casting substrate 205 and porous support body 206 comprising a permeable material, such as plaster (for example, plaster of Paris), or a support body comprising an impermeable material, such as plastic, having holes 220 through the thickness of the support body. During casting, ceramic particles from the ceramic suspension may build up on the casting substrate 205 of the lower casting assembly. In one embodiment, the porous vertical body, casting substrate and support body may be comprised of the same or different porous material.

In one embodiment, the casting apparatus 200 comprises an upper case 214 (FIG. 1 at 109) that covers permeable components of the upper casting assembly 201 such as the through holes 211 of the mold and the porous vertical body 212. The casting apparatus may further comprise a lower case 215 (FIG. 1 at 110) that covers permeable components of a lower casting assembly 202, such as outer surfaces of a porous support body. The impermeable upper and lower cases restrict the flow of vacuum, air, and liquids through the apparatus, and may help maintain a stable pressure within the casting apparatus during casting processes. The upper and lower cases may be comprised of a material that is resistant to penetration by the liquid ceramic suspension under vacuum and/or pressure casting conditions, such as metal or plastic.

The upper case 214 may surround the outer surface of the porous vertical body 212 in a spaced arrangement forming a gap 216 (FIG. 1 at 111) there between. The gap 216 is adjacent a portion of the porous vertical body that abuts mold wall openings 211. During a vacuum casting process, pressure may be reduced in the gap 216 as vacuum pressure is applied to the apparatus (e.g., to the lower casting assembly). Liquid evacuated radially from the mold cavity through mold wall openings 211 may pass through the porous vertical body 212 and into the gap 216. In one embodiment, vacuum is applied under the support body 206 and through open channels 217 (FIG. 1 at 108) extending through the thickness of the support body 206 that align with the gap 216. Upon application of vacuum, liquid from the suspension passing into the gap 216 may be eliminated through the channels 217 (FIG. 1 at 108), and out of the casting apparatus 200.

The casting substrate 205 may comprise a porous material having an average pore size sufficiently small to inhibit ceramic particles in the ceramic suspension from entering into the pore volume of the casting substrate during the vacuum/pressure casting process while evacuating the liquid component of the suspension. In one embodiment, a porous casting substrate 205 has an average pore size of less than 1 µm. The porous casting substrate may be comprised of, for example, a porous ceramic, such as plaster, a porous metal, or a porous polymer. In one embodiment, the porous casting substrate is the upper surface of the porous support body. In another embodiment, the porous casting substrate and the support body are separate components that are assembled in stacked configuration for the casting process. The support body and/or the porous vertical body may be made of a porous ceramic (e.g. plaster such as gypsum), porous metal, or porous polymer material, that is the same or different material of the porous casting substrate.

Figure 2J:
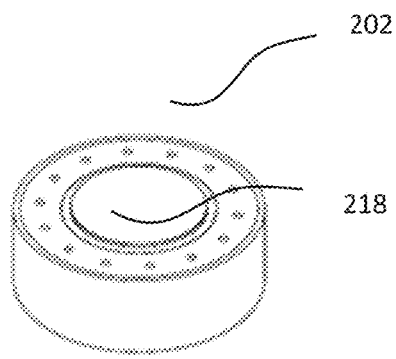
FIGS. 2J and 2K are top perspective and exploded views, respectively, of one embodiment of a lower casting assembly for radial-only casting.
Figure 2K:
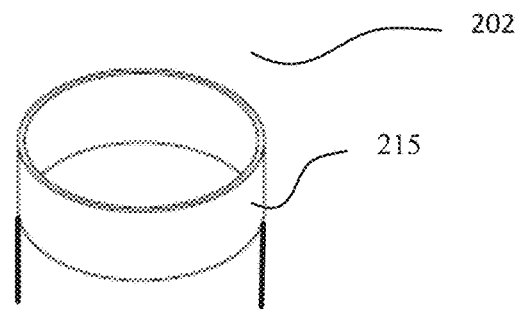
Figure 2K:
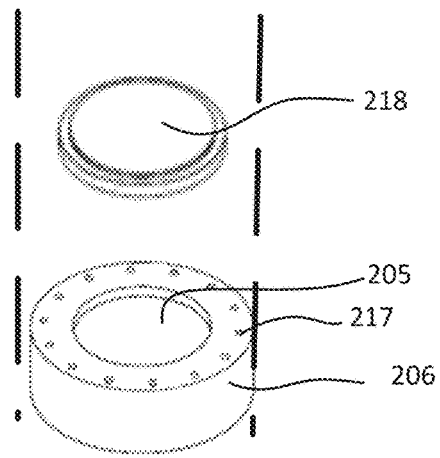
Figure 2L:
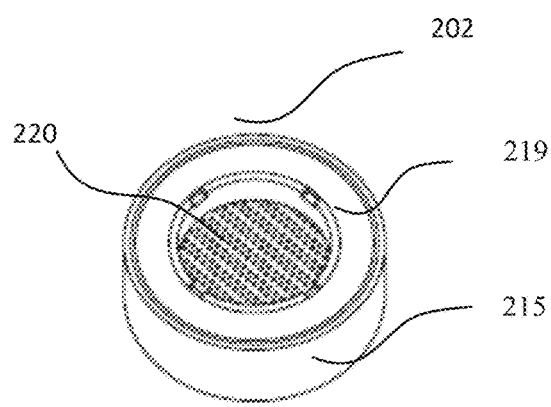
FIG. 2L is a bottom perspective view of one embodiment of a lower casting assembly for axial-only casting.

In one embodiment, a radial casting process is used to evacuate liquid through mold wall openings, in the absence of axial casting. The flow of liquid through the bottom end 209 of the mold in the axial (z-axis) direction may be inhibited by blocking vacuum pressure through the casting substrate 205. In this embodiment, the casting substrate 205, the support body 206, or both, may be non-porous, or may comprise material that is impermeable to the flow of liquid and air during vacuum casting conditions. In one embodiment, as illustrated in FIGS. 2J and 2K, an impermeable component 218 may be placed over a support body 206 to block the flow of liquid through the casting substrate and support body.

Where a casting process is in the axial-only casting direction, evacuation of liquid from the suspension through mold wall openings is inhibited to prevent radial casting. In one embodiment, as illustrated in the bottom perspective view of the lower casting assembly of FIG. 2L, an impermeable gasket 219 may be placed under the support body 206 of the lower casting assembly 202. The gasket 219 blocks air and vacuum through channels 217 thereby, preventing a pressure drop in a gap 216 of the upper casting assembly. In this embodiment, casting and evacuation of suspension liquid occurs in the axial direction only, as liquid is discharged through holes 220 in a support body 206 made of an impermeable material, or alternatively, through a porous support body.

In FIGS. 3A through 3E, an exemplary embodiment of a dual vacuum-pressure casting apparatus 300 is provided. Components of the apparatus may be made of a metal or other material having sufficient strength to withstand the application of positive pressure during the pressure casting process. In one embodiment, the apparatus 300 comprises a metal cylinder having a first region that comprises a slurry chamber 301 and a second region that comprises a mold (not shown). The metal mold has mold wall openings that extend through the thickness of the metal cylinder. A porous vertical body (not shown) may surround the outside of the metal mold, and the porous material may extend through the thickness of mold wall openings so that an inner wall of the mold comprises both impermeable metal mold wall portions and permeable porous material that fills the mold wall openings.

An upper case 302 may be provided that surrounds the metal mold and, optionally, slurry chamber; to restrict the flow of air, vacuum, and liquids, and to maintain pressure within the casting apparatus during a dual pressure-vacuum casting process. The upper case may be, for example, metal or plastic. As seen in an illustration of an exploded view, a lid 303 covers the slurry chamber 301 when assembled, and may be attached to a flange 304 at the top of the slurry chamber 301. Attachment means, such as latches or screws extending through holes 305 on the lid 303 and flange 304 are capable of securing the apparatus under positive pressure. As illustrated in the top-down view of FIG. 3C, the lid 303 may comprise one or more inlets 306, such as ports for delivery of the ceramic suspension or pressurized air into the mold cavity, and also a port for a pressure gauge and/or pressure releasing valve. Compressed gas, such as air, and/or the slurry may be introduced by way of a hose or nozzle aligned with the inlet 306 for delivery into the slurry chamber 301.

Figure 3A:
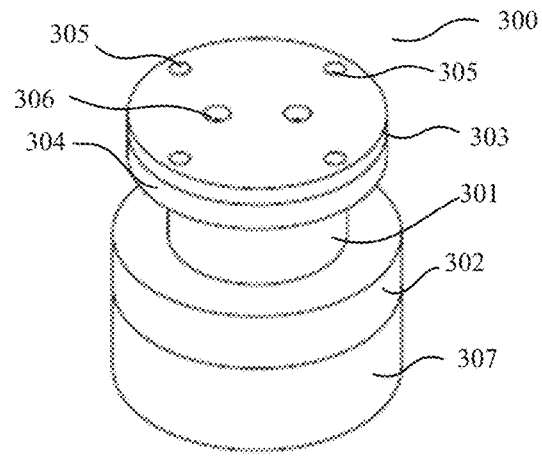
FIGS. 3A through 3E are perspective, front, top, bottom and exploded views, respectively, of an embodiment of a dual directional vacuum and pressure casting apparatus.
Figure 3B:
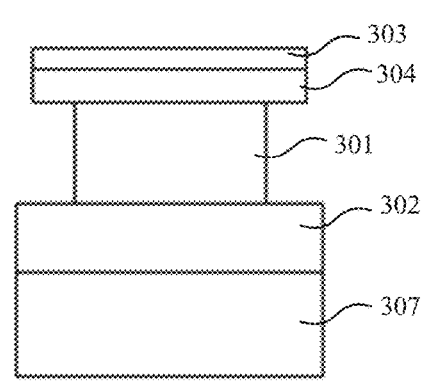
Figure 3C:
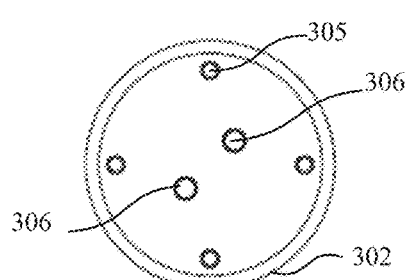
Figure 3D:
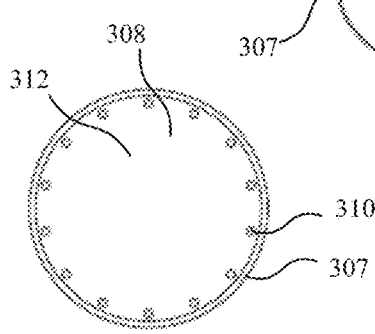
Figure 3E:
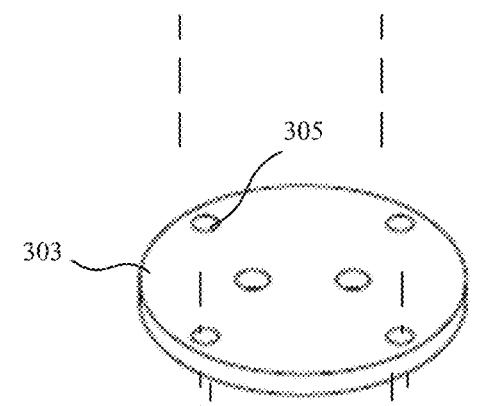
Figure 3E:
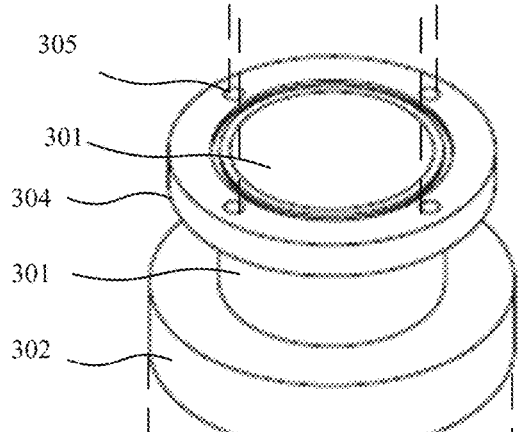
Figure 3E:
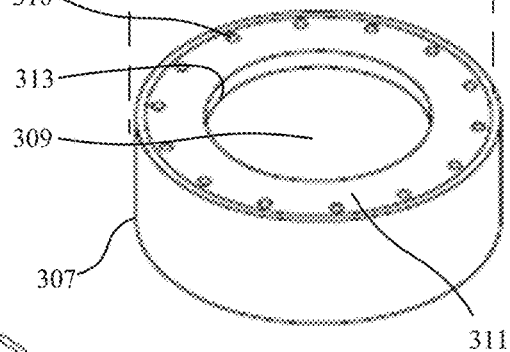

As illustrated in a bottom-up view of FIG. 3D, the lower case 307 surrounds the porous support body 308 that has a circular recess 313 in which the casting substrate 309 is located. When assembled, the bottom of the mold fits within the recess for support and stabilization during the casting process. Channels 310 visible from the upper surface 311 and lower surface 312 of the support body 308 allow for removal of liquid that is evacuated through mold wall openings. Ceramic suspension dispensed into the mold may be cast by applying pressure through the slurry chamber. Pressure during the casting process may be less than 300 psi pressure, or approximately 20 psi to 250 psi, or 40 psi to 200 psi, or 40 psi to 100 psi, or greater than or equal to approximately 50 psi, such as 50 psi to 150 psi. In some embodiments, vacuum is introduced to the casting apparatus beneath the lower casting assembly, for example, under the support body, while positive pressure is simultaneously introduced into the upper casting assembly through the slurry chamber.

Figure 4A:
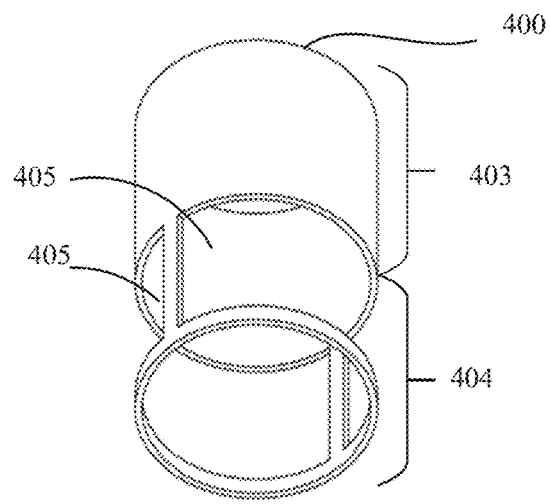
FIGS. 4A through 4C are illustrations of several embodiments of slurry chambers and molds.
Figure 4B:
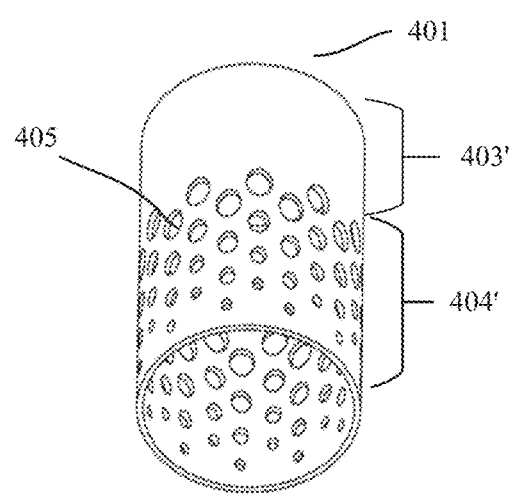
Figure 4C:
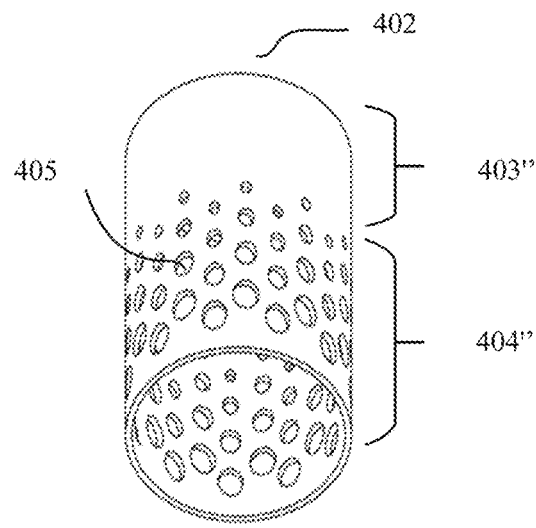

In exemplary embodiments illustrated in FIGS. 4A, 4B and 4C, each cylindrical component 400, 401 and 402, comprises an upper portion comprising a slurry chamber (403, 403' and 403") and a lower portion comprising a mold (404, 404' and 404") at opposite ends of a continuous length. One or more mold wall openings 405 extend through the impermeable material of the mold wall for discharging liquid radially. Mold wall openings 405 may be uniform in size and shape, or a plurality of openings 405 may have more than one diameter or shape. Mold wall openings 405 may be any shape such as circular, rectangular, diamond, and the like, having a width or diameter of about 0.1 mm to 15 mm, or between 1 mm and 15 mm, or between 2 mm and 10 mm.

The open area in the mold wall formed by the openings 405 may comprise up to 95% of the area of the vertical walls surrounding the mold cavity (404, 404' and 404"). In one embodiment, mold wall openings are from 1 mm to 10 mm in diameter (or width), and the open area formed from a plurality of the mold wall openings is about 1% to 70%, or 2% to 50%, or 2% to 30% of the mold wall. In another embodiment illustrated in FIG. 4A, the mold comprises one mold wall opening 405 that comprises up to 95%, such as from 40% to 90%, of the area of the mold wall surrounding the mold cavity.

Figure 4D:
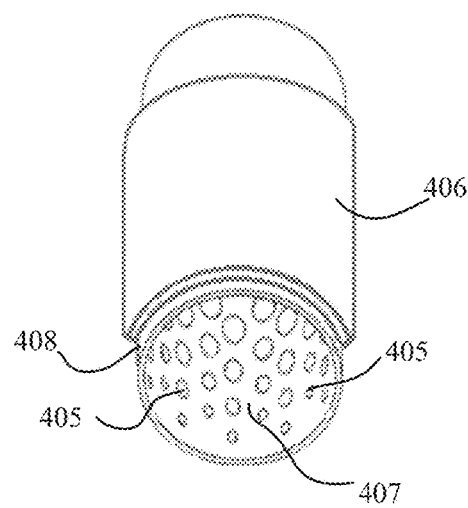
FIG. 4D is an illustration of exemplary embodiments of a slurry chamber and mold with a porous vertical body.

A porous vertical material 406, such as a porous plaster, may surround the outside of the mold (e.g., 404, 404' or 404"), as illustrated in FIG. 4D, and may fill mold wall openings 405. In one embodiment, the porous material that fills the mold wall openings forms a portion of the inner surface 407 of the mold cavity. In one embodiment, a mold (e.g., 404, 404', 404") is provided that comprises 1) a mold wall surrounding the mold cavity comprised of an impermeable material, 2) an open portion in the mold wall comprising from 2% to 95% of the area of the mold wall, and 3) a porous material, such as a plaster, that fills the open portion of the mold wall.

In one embodiment, as illustrated in FIG. 4D, the perimeter of the bottom mold that engages with the support body and contacts a casting substrate during a casting process comprises a solid band 408 of material that it impermeable to the suspension under casting conditions. In this embodiment, the mold wall has no mold wall openings around the perimeter of the second end 408 of the mold cavity. The height of the solid band from the second end of the mold cavity to a mold wall opening is at least about 1 mm to 15 mm; in some embodiments, the solid band has a height up to 20% of the height of the mold cavity. In one embodiment, when assembled with a casting substrate during an infiltration process, a solid band 408 of impermeable material at the lower end of the mold cavity fits within a recess of the support body.

Figure 4E:
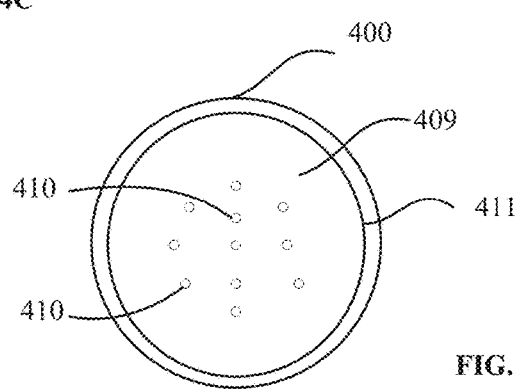
FIG. 4E is a top-down illustration of an embodiment of a slurry chamber and mold with a permeable separator.

In one embodiment, the mold 404 and the slurry chamber 403 are separated, for example, by a permeable divider or a ring. As illustrated in the top down view of the cylinder 400 of FIG. 4E, the mold and the slurry chamber are separated by a permeable divider 409. In this embodiment, the ceramic suspension is introduced from the slurry chamber into mold through the permeable divider 409 comprised of an impermeable material having holes 410 that are larger than the ceramic particles of the suspension. The holes 410 may extend uniformly across the surface of the permeable divider 409. In an alternative embodiment, as illustrated in FIG. 4E, the holes 410 may be arranged towards the center of the mold cavity with no holes adjacent the mold wall 411. In some embodiments, the permeable divider or ring may inhibit buildup of excess ceramic material on the mold wall beyond the height of the ring or permeable divider.

Figure 5:
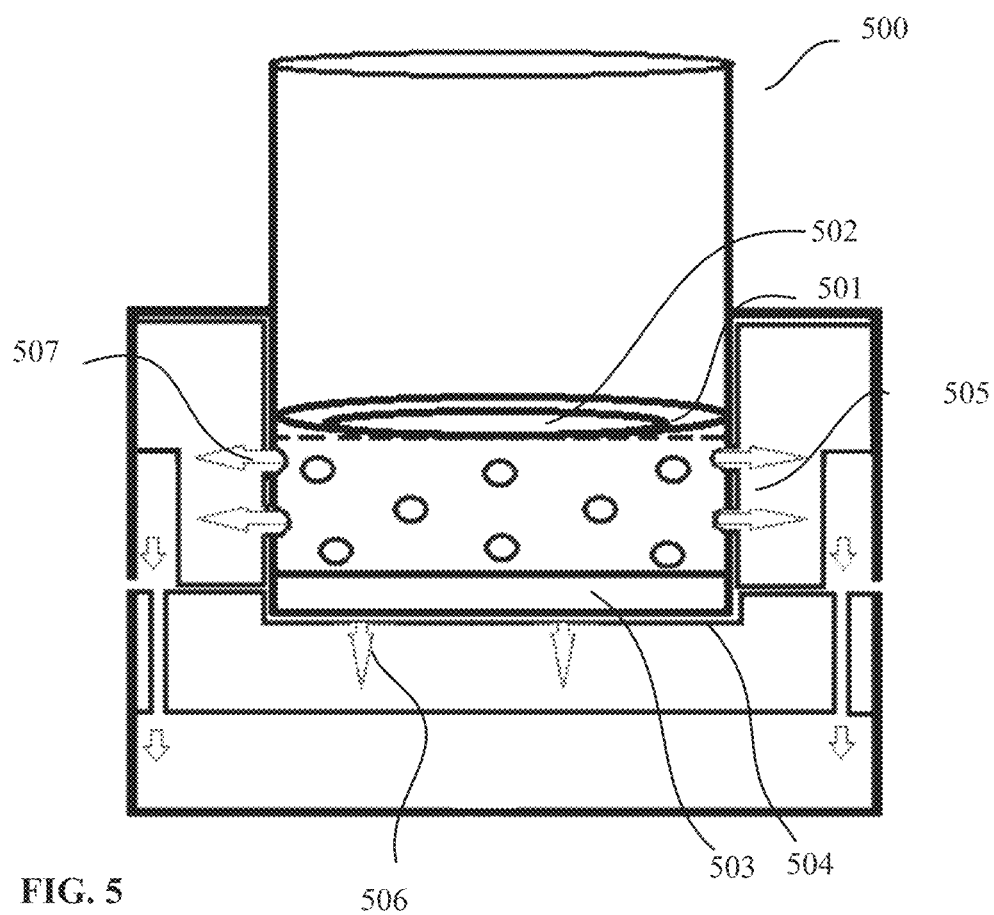
FIG. 5 is a cross-sectional illustration of an embodiment of components of a dual directional vacuum casting apparatus and casting directions.

In an alternative embodiment, as illustrated in the casting apparatus 500 of FIG. 5, a ring 501 separates the slurry chamber and mold cavity. The ring 501 extends from the mold wall towards the center of the mold cavity inhibiting buildup of excess ceramic material on the mold wall beyond the ring. The ring may be about 1 mm to 10 mm wide, and the diameter of the ring opening 502 (through which ceramic suspension moves from the slurry chamber to the mold cavity) may be about 3% to 99% of the diameter of the mold cavity.

Figure 6:
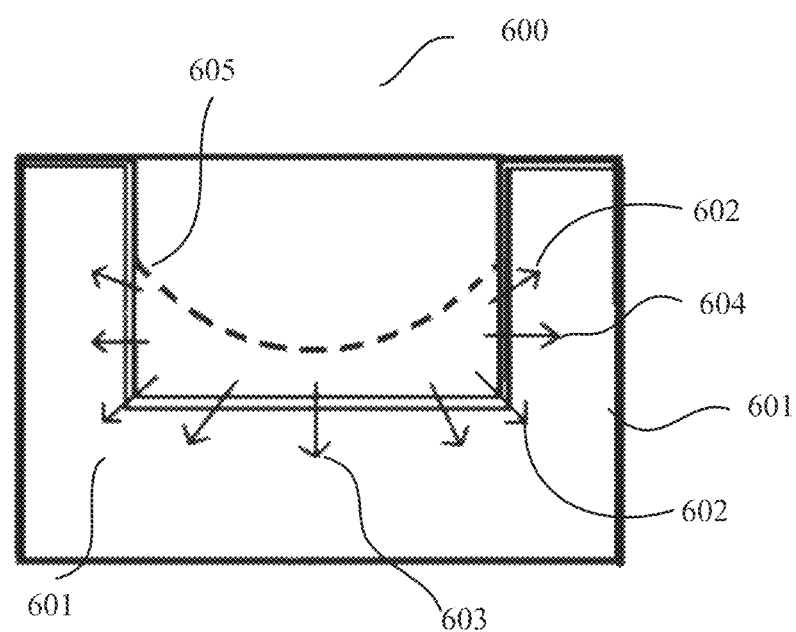
FIG. 6 is a cross-sectional illustration of a traditional casting setup.

With reference to FIG. 5, while not wishing to be bound by theory, it is believed that a casting method that incorporates both a solid impermeable band 503 adjacent the lower mold cavity end and/or an impermeable ring 501 between the slurry chamber and the upper mold cavity end, may inhibit uneven buildup of ceramic particles along the mold wall. As illustrated in FIG. 6, in a conventional casting process using a casting apparatus 600 where the entire mold 601 is porous, liquid discharged through porous mold walls in directions other than axial and radial. For example, discharge of liquid from the suspension in a diagonal direction 602 relative to an axial 603 and/or radial 604 casting direction may result in uneven ceramic buildup around the edge between the vertical mold walls and the casting substrate, forming a cast body having a concave surface 605 as ceramic buildup is greater adjacent the mold wall than at a midpoint between mold walls. As illustrated in FIG. 5, a mold comprising an impermeable vertical band of material 503 on the mold walls, adjacent a porous casting substrate 504 and the porous vertical body 505, and/or a ring of impermeable material between the mold and the slurry chamber, may minimize flow of liquid suspension in a diagonal direction relative to the axial 506 or radial directions 507, reducing ceramic buildup at the edge and reducing formation of a concave surface.

A release agent may be applied to one or more surfaces of the mold cavity to facilitate removal of the cast ceramic body from the mold. Release agents include but are not limited to lubricants such as petroleum jelly, oleic acid, and the like, (e.g., Slide® Pure Eze Mold Release by Slide Products, Inc. IL, USA) that are at least partially insoluble under casting conditions. In some embodiments, approximately 1 psi or greater, such as 3 psi to 30 psi, may be applied by mechanical piston, or compressed gas, such as compressed air for a quick ejection of a cast ceramic body from the mold. In one embodiment, the upper and lower casting assembly are separated and compressed is delivered into the mold cavity, for example via one or more hoses, fittings, nozzles through the upper casting assembly.

Ceramic particles used in the suspensions may comprise, but are not limited to, alumina, zirconia, boron carbide, silicon carbide, spinel, and barium titanate, and other ceramic materials suitable for use in dental restorations, such as crowns, veneers, bridges and dentures. In some embodiments, ceramic material may comprise zirconia, alumina, or combinations thereof. Zirconia ceramic material may comprise unstabilized or stabilized (including partially stabilized or fully stabilized) zirconia ceramic material.

In some embodiments, zirconia ceramic powders include zirconia that has been stabilized with yttria. For example, yttria-stabilized zirconia may be stabilized with approximately 0.1 mol % to approximately 8 mol % yttria, such as approximately 2 mol % to 7 mol % yttria, or approximately 2 mol % to approximately 4 mol % yttria, or approximately 4 mol % to approximately 6 mol % yttria. Specific examples of yttria-stabilized zirconia powders include yttria-stabilized zirconia commercially available from Tosoh USA, such as Tosoh TZ-3YS (containing approximately 3 mol % yttria, nominally 3Y), Tosoh PX485 (containing approximately 4 mol % yttria, nominally 4Y), and Tosoh PX430 (containing approximately 5 mol % to 6 mol % yttria, such as nominally 5.5Y). Commercially available zirconia powder may have a measured particle size D(50) of about 600 nm or more, which constitute agglomerations of particles of crystallites having an actual particle size of about 20 nm to 40 nm.

As used herein, the term "measured particle size" refers to measurements obtained by a Brookhaven Instruments Corp. X-ray disk centrifuge analyzer. As used herein, the term "micron-size" zirconia may include zirconia ceramic having an average (D(50)) measured particle size greater than 100 nm, such as, between 100 nm and 1000 µm, or between 200 nm and 500 µm, or between 200 nm and 500 nm. In some embodiments, comminution processes described herein may to reduce the measured particle size of zirconia powder contained in the suspension, for example, from D(50)<600 nm, to a range of D(50)=100 nm to 400 nm, such as D(50)=200 nm to 300 nm. As used herein, the term "nano-size" zirconia may include zirconia ceramic having an average particle size less than 100 nm, such as between 20 nm and 70 nm.

Yttria-stabilized zirconia powders may further comprise alumina at a concentration of 0 wt % to 0.25 wt %, such as 0.1 wt %, relative to the zirconia powder. Optional additives include coloring agents and esthetic additives, such as metal oxides and metal salts, or other metal-containing compounds used to obtain dentally acceptable shades in final sintered restorations. In some embodiments, further processing aids such as binders and dispersants may be added to the suspension.

Dispersant may be used to promote dispersion and stability of the suspension, and to control the viscosity of the slip, during the casting process. Dispersion and deflocculation may occur through electrostatic, electrosteric, or steric stabilization. Examples of suitable dispersants include nitric acid, hydrochloric acid, citric acid, diammonium citrate, triammonium citrate, polycitrate, polyethyleneimine, polyacrylic acid, polymethacrylic acid, polymethacrylate, polyethylene glycols, polyvinyl alcohol, polyvinyl pyrillidone, carbonic acid, and various polymers and salts thereof. These materials may be purchased commercially or prepared by well-known techniques. Specific examples of commercially available dispersants include Darvan® 821-A ammonium polyacrylate dispersing agent commercially available from Vanderbilt Minerals, LLC; Dolapix™ CE 64 organic dispersing agent and Dolapix™ PC 75 synthetic polyelectrolyte dispersing agent (commercially available from Zschimmer & Schwarz GmbH), and Duramax™ D 3005 ceramic dispersant (commercially available from Rohm & Haas Company).

The liquid component of the ceramic suspension may comprise water, organic solvent, inorganic solvent, or a combination, thereof. A ceramic suspension may comprise a solid ceramic loading of between 40 wt % and 90 w %, or between 45 wt % and 80 w %, based on the total weight of the ceramic suspension. Upon adding zirconia powder and dispersant to the liquid component, the suspension may be subjected to a comminution process by which the zirconia powder particles are mixed, deagglomerated, and/or reduced in size. Comminution is performed using one or more milling processes, such as attritor milling, horizontal bead milling, ultrasonic milling, or other milling or comminution process, such as high shear mixing, ultra high shear mixing capable of reducing the zirconia powder particle sizes described herein. The resulting ceramic dispersion or suspension may be cast in the casting apparatus by processes described herein.

In one embodiment, a casting apparatus is provided that is adjustable for casting a zirconia ceramic suspension in nine modes: 1) axial direction casting under vacuum, 2) axial direction casting under positive pressure, 3) axial direction casting under vacuum and positive pressure, 4) radial direction casting under vacuum, 5) radial direction casting under positive pressure, 6) radial direction casting under vacuum and positive pressure, 7) radial direction and axial direction casting under vacuum, 8) radial direction and axial direction casting under positive pressure, and 9) radial direction and axial direction casting under vacuum and positive pressure. Vacuum pressure, positive pressure or both, may be selectively introduced into the casting assembly to optimize casting conditions.

In one embodiment, a method for making a solid ceramic block by dual direction (radial and axial directions) vacuum-pressure casting, comprises; i. providing a dual vacuum-pressure casting apparatus that comprises a slurry chamber, a mold having mold wall openings, and an impermeable ring within the mold between the slurry chamber and the mold; a porous casting substrate, a porous supporting body, and a porous vertical body, wherein the porous vertical body surrounds the outer surface of the mold; ii. delivering a ceramic suspension into the mold through the slurry chamber and applying both vacuum and positive pressure to the casting apparatus; iii casting the suspension on the casting substrate and the mold wall; iv. discharging liquid from the ceramic suspension through the mold wall openings into the porous vertical body and through the porous casting substrate; iv. consolidating ceramic particles forming a ceramic green body within the mold cavity; v. separating the porous casting substrate from the mold to expose a mold opening; and vi. ejecting the resulting ceramic green body from the mold opening.

In vacuum casting processes, casting in a radial-only direction may be accomplished by blocking vacuum through the casting substrate thereby preventing or reducing flow in the axial direction and increasing flow radially through the mold wall openings and porous vertical body. In contrast, vacuum casting in an axial-only direction may be accomplished by blocking vacuum adjacent the porous vertical body, thereby preventing or reducing flow radially through mold wall openings, and increasing flow axially through the porous casting substrate. For example, an impermeable material, such as a gasket or ring, may be placed around the support body to block channels in the lower assembly that are in communication with the gap in the upper casting assembly. By blocking channels through the support body, a pressure drop adjacent the porous vertical body may be eliminated, thereby inhibiting radial flow through the vertical mold walls.

In pressure casting processes, casting in the radial-only direction may be accomplished, for example, by use of an impermeable casting substrate that blocks flow of the ceramic suspension liquid axially through the casting substrate. Pressure casting in the axial-only direction may be accomplished by blocking radial flow through the mold wall and porous vertical body, for example, by use of a mold with no mold wall openings.

By the processes described herein, a ceramic body may be formed having any shape, such as a large disc-shaped dental milling block suitable for multiple dental components (e.g., 101 mm diameter blocks), or a small milling block suitable for use in milling a single restoration such as a crown.

A solid zirconia disc may be formed by dual-direction vacuum and pressure casting processes that significantly reduce casting time compared to known single direction vacuum casting processes. In one embodiment, a solid zirconia disc having a height greater than or equal to 21 mm may be cast in less than or equal to 2 hours 30 minutes, from a ceramic suspension of micron-sized zirconia particles by processes described herein, wherein the block is cast approximately 12 times as fast as single (axial-only) direction vacuum casting. By processes described herein, solid zirconia discs made from zirconia nano-suspension (e.g., zirconia having a median particle size less than 100 n ay be cast, for example, into a 98 mm diameter block having a cast thickness greater than or equal to 20 mm in 15 days or fewer. Zirconia blocks made from zirconia nano-suspension may be cast that have a thickness greater than 10 mm, or greater than 20 mm, or greater than 30 mm, or greater than 40 mm, in fewer than 15 days. In some embodiments, the cast ceramic blocks made from zirconia nano-suspension may have a fracture toughness value greater than 11 MPa*m$^{1/2}$.

EXAMPLES

Zirconia Ceramic Materials

Commercially available yttria-stabilized zirconia powders and commercially available yttria-stabilized zirconia suspensions used to make ceramic casting suspensions are provided in Table 1. In some embodiments, the zirconia ceramic materials were combined to make the zirconia ceramic casting suspensions.

TABLE 1

| Zirconia Powder Used to Prepare Ceramic Suspension | | |
|---|---|---|
| Media Particle Size (D50) | Zirconia Powder | |
| micron-sized powder (D50 = 200 μm) | ~5.5 mol % $Y_2O_3$- stabilized $ZrO_2$ powder (PX-430) [1] | ~3 mol % $Y_2O_3$-stabilized $ZrO_2$ powder (TZ-3YS) [1] |
| nano-sized suspension (D50 = 24 nm) | ~3 mol % $Y_2O_3$- stabilized $ZrO_2$ nano concentration [2] | ~5 mol % $Y_2O_2$-stabilized $ZrO_2$ nano concentration [2] |

TABLE 1-continued

| Zirconia Powder Used to Prepare Ceramic Suspension | | |
|---|---|---|
| Media Particle Size (D50) | Zirconia Powder | |
| nano-sized powder (D50 = 45 nm) | ~3 mol % $Y_2O_3$- stabilized $ZrO_2$ powder [3] | ~8 mol % $Y_2O_3$-stabilized $ZrO_2$ powder [3] |

[1] Tosoh Corporation, Tokyo, Japan;
[2] MEL Chemicals Inc., Manchester, England;
[3] Inframat ® Advanced Materials ™, Connecticut, USA.

Micron Suspension: PX-430 (5.5Y) and TZ-3YS (3Y) (Tosoh Corporation, Tokyo, Japan) micron-sized powders were mixed in de-ionized water with addition of Dolapix CE 64 dispersant (Zschimmer & Schwarz, Inc., Lahnstein, Denmark) to make 4.9 mol % $Y_2O_3$-stabilized $ZrO_2$ compositional suspension. Mixing was performed by milling in the NETZSCH LabStar (NETZSCH Premier Technologies, LLC. Exton, Pa., USA). The following parameters were used: 500 RPM for pump speed, 2000 RPM for agitator speed. The throughput was 10 kg of 4.9 mol % yttria-containing zirconia suspension.

Example 1 and Example 2

Zirconia ceramic bodies were cast from commercially available nano-sized yttria-stabilized zirconia suspension, and efficiencies of single (axial) and dual (axial and radial) casting were compared for casting nano-sized zirconia.

A ceramic suspension of nano-size (D50=24 nm) 5 mol % yttria-stabilized zirconia (MELox 5Y) with a solids content of 55 wt % was obtained from Mel Chemicals Inc. (Manchester, England)

The casting apparatus comprised of an upper casting assembly and a lower casting assembly. The upper casting assembly comprised a cylindrical body that was open at top and bottom ends. The top and bottom regions of the cylindrical body were the slurry chamber and the mold, respectively. The slurry chamber was approximately two-thirds the height of the cylindrical body and the mold was approximately one-third of the height of the cylindrical body. The mold cavity of each casting apparatus had a 38 mm diameter. Mold walls were made of an acrylic plastic that was impermeable to the casting suspension liquid during the casting process. For single direction (axial-only) vacuum casting, the vertical mold walls were solid, having no mold wall through holes, thus, preventing radial discharge of suspension liquid from the mold.

For dual direction vacuum casting, the mold wall comprised a plurality of circular 3 mm diameter mold wall openings that were distributed evenly around the mold cavity, except that the bottom perimeter (approximately 8 mm to 10 mm) of the mold wall was solid, having no openings. The openings comprised about 30% of the mold wall surface area. A 20 mm thick porous vertical body comprised of a plaster material covered the outer surface of the mold wall filling the through holes; the plaster in the through holes was level with the inner mold walls forming a smooth cavity surface. An impermeable housing surrounded the mold and porous vertical body, and a gap was formed between the porous vertical body and the impermeable housing for expelling suspension liquid that passed radially through mold wall openings and the porous vertical body during the casting process.

The lower casting assembly comprised a porous support body made from a mixture of plaster of Paris powder and water in the ratio of 100 g and 70 g. The porous casting substrate was formed by making a recess on the upper surface of the porous support body. When assembled, the bottom perimeter of the mold was fitted within the recess of the porous support body. In the dual direction vacuum casting apparatus, the channels around the perimeter of the porous support body aligned with the gap around the perimeter of the porous vertical body of the upper casting assembly. During radial casting, liquid that passed through the mold wall holes and the porous vertical body was evacuated from the casting apparatus through the aligned gap and channels of the upper and lower casting assemblies. For axial casting, liquid that passed axially through the bottom of the mold and into the porous casting substrate, was evacuated through the bottom of the porous support body.

Figure 7:
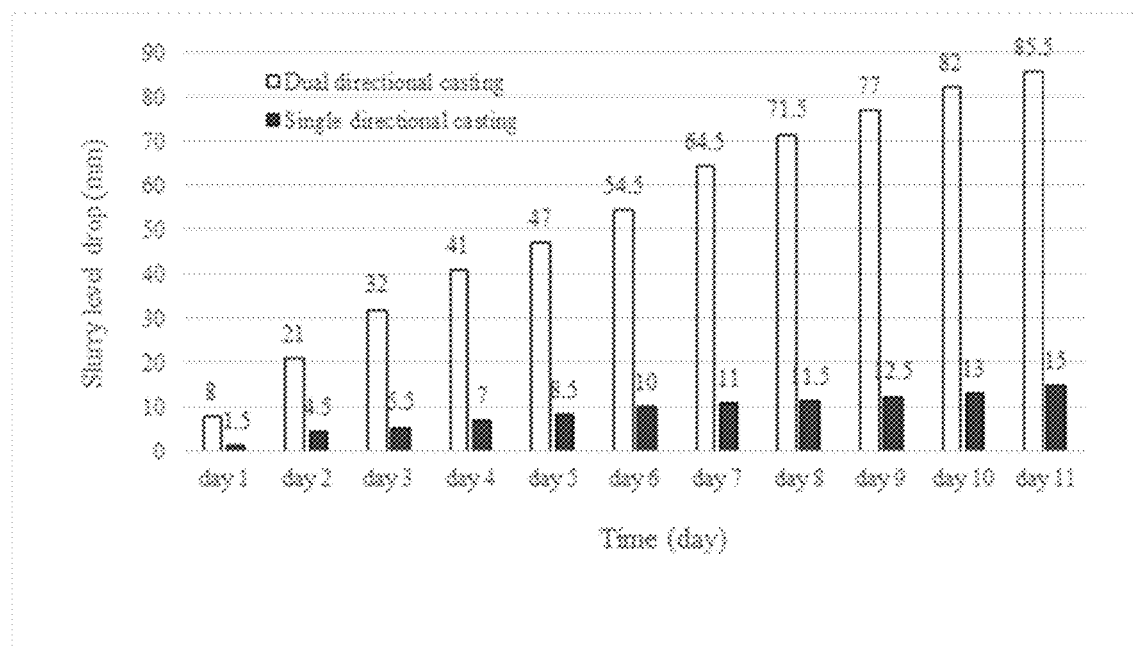
FIG. 7 is a graphical representation of results of casting processes described herein.

About 280 g of the ceramic suspension was added to each slurry chamber of the single (axial) direction and a dual direction (axial and radial) vacuum casting apparatus. The al level of suspension was marked on the surface of the slurry chamber of each apparatus. A vacuum pressure of about 27 inHg was applied to the bottom surface of the porous supporting body. The suspension was measured daily for 11 days, and the drop in suspension level from the initial mark was recorded. FIG. 7 shows change of suspension level over time for 11 days for both dual direction (axial and radial) casting and single direction (axial only) casting setups.

TABLE 2

Ceramic Suspension Level Drop For Axial/Radial and Axial-Only Vacuum Casting of 5 mol % $Y_2O_3$-stabilized Nano-Zirconia Suspension.

| Time (day) | Ex. 1 Dual Direction Vacuum Casting (Suspension drop in mm) | Ex. 2 Axial-only Direction Vacuum Casting (Suspension drop in mm) |
|---|---|---|
| 1 | 8 | 1.5 |
| 2 | 21 | 4.5 |
| 3 | 32 | 5.5 |
| 4 | 41 | 7 |
| 5 | 47 | 8.5 |
| 6 | 54.5 | 10 |
| 7 | 64.5 | 11 |
| 8 | 71.5 | 11.5 |
| 9 | 77 | 12.5 |
| 10 | 82 | 13 |
| 11 | 85.5 | 15 |

As reported in Table 2, after vacuum casting for 11 days, the suspension level dropped 85.5 mm under dual directional vacuum casting conditions compared to a 15 mm drop under single directional (axial-only direction) vacuum casting. Thus, over 11 days, the suspension level dropped 5.7 times more in the dual (axial and radial) direction vacuum setup than in the single direction (axial-only) vacuum casting process.

Figure 8:
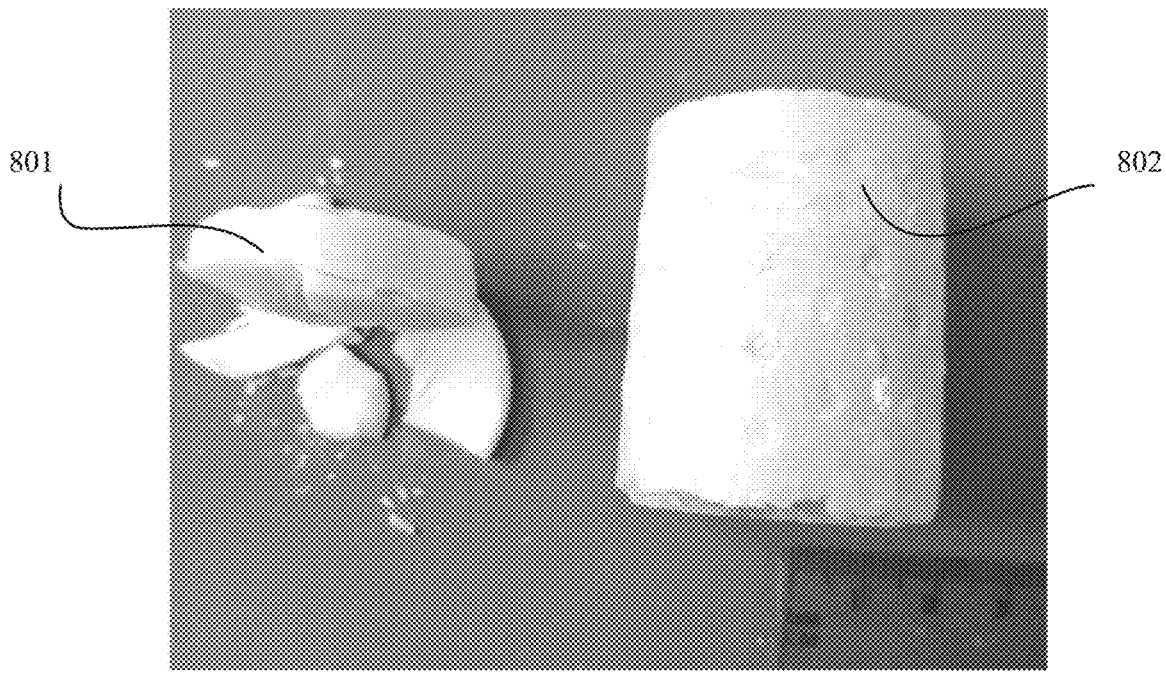
FIG. 8 is a photograph of two ceramic bodies cast by processes described herein.

FIG. 8 shows an optical micrograph of two 38 mm diameter blocks after 11 days of casting in single direction vacuum casting process 801 and dual direction vacuum casting process 802. Single direction vacuum casting (axial-only) resulted in a 12 mm thick block 801 that was broken. Dual direction casting resulted in a 43 mm thick (3.6 times thicker) block 802 without breakage.

Example 3 and Example 4

Zirconia ceramic bodies were cast from nano-sized yttria-stabilized zirconia suspensions, and efficiencies of two dual direction vacuum casting apparatus (axial and radial vacuum) having different sized radial through holes were compared for casting nano-sized zirconia.

Two dual direction vacuum casting apparatus were made substantially according to the dual direction apparatus of Example 1. The upper and lower casting assemblies were adapted to accommodate a 101 mm diameter mold, and were modified as described herein. To facilitate radial casting, the first apparatus had multiple 3 mm diameter circular holes through the mold wall; the second casting apparatus had 7 mm diameter circular holes through the mold cavity wall. The mold cavity diameters were 101 mm. A 20 min thick porous vertical body comprised of plaster covered the outer surfaces of the mold walls and covered the holes/openings through the mold wall. An impermeable housing encased the porous vertical body and mold, forming a gap between the impermeable housing and the porous vertical body to evacuate liquid that passed through covered mold wall holes during the casting process. When assembled, gap in the plaster aligned with holes that extended through the thickness of the porous support body.

A 3 mol % yttria-stabilized zirconia nano-suspension having a solid loading of about 55 wt % was obtained from Mel Chemicals. The first casting assembly (with 3 mm holes) was filled with 1800 g of zirconia suspension. The second casting assembly (with 7 mm holes) was also filled with 1800 g zirconia suspension. The initial slurry levels were marked inside of the slurry chambers of each casting assembly. A vacuum pressure of about 27 inHg was maintained through the casting period. Drops in slurry level (measured in mm) and block thickness buildup (mm) were measured daily for 14 days for the first casting assembly (3 mm hole diameter, FIG. 9) and 9 days for the second casting assembly (7 mm hole diameter, FIG. 10), were reported in Table 3.

TABLE 3

Casting Rate And Block Thickness Measured Daily For Dual Direction Vacuum Casting Set-ups.

| | Ex. 3 Dual-Direction Vacuum (3 mm diameter holes) | | Ex. 4 Dual-Direction Vacuum (7 mm diameter holes) | |
|---|---|---|---|---|
| Time (day) | Suspension level drop (mm) | Block build-up thickness (mm) | Suspension level drop (mm) | Block build-up thickness (mm) |
| 1 | 1.5 | 0 | 6.5 | 1.5 |
| 2 | 9 | 3 | 21 | 5 |
| 3 | 12 | 3.5 | 22 | 6 |
| 4 | 15 | 6 | 30 | 12 |
| 5 | 20 | 9 | 36.5 | 15 |
| 6 | 24 | 11 | 42.5 | 19 |
| 7 | 26.5 | 13 | 47.5 | 22.5 |
| 8 | 29 | 15 | 54 | 23 |
| 9 | 31.5 | 17 | 59 | 22 |
| 10 | 33.5 | 18 | — | — |
| 11 | 35 | 19 | — | — |
| 12 | 37 | 20 | — | — |
| 13 | 40 | 23.5 | — | — |
| 14 | 43 | 24 | — | — |

Figure 9:
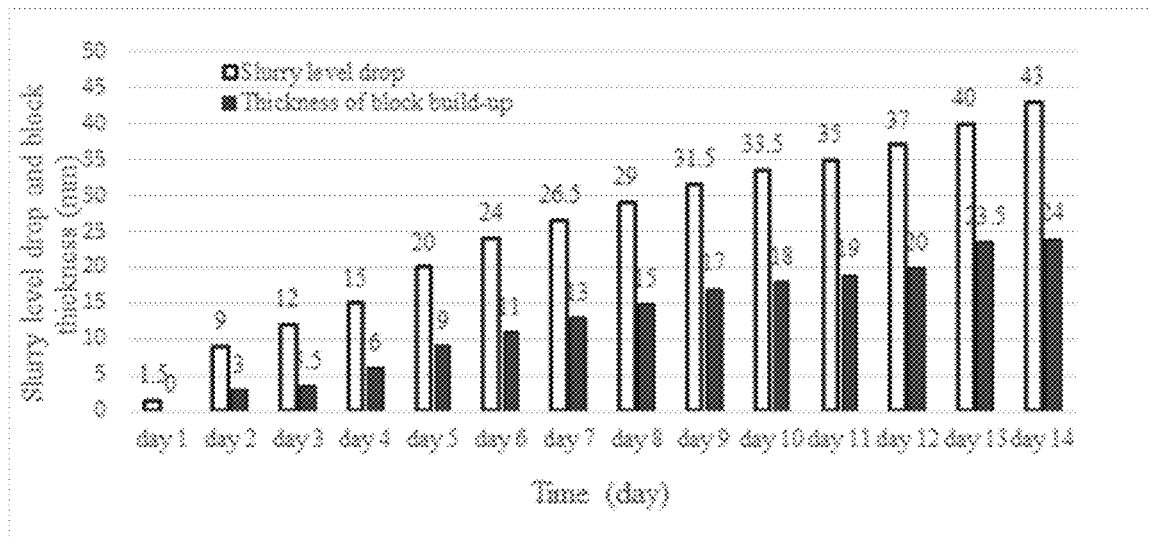
FIGS. 9 and 10 are graphical representations of results of casting processes described herein.
Figure 10:
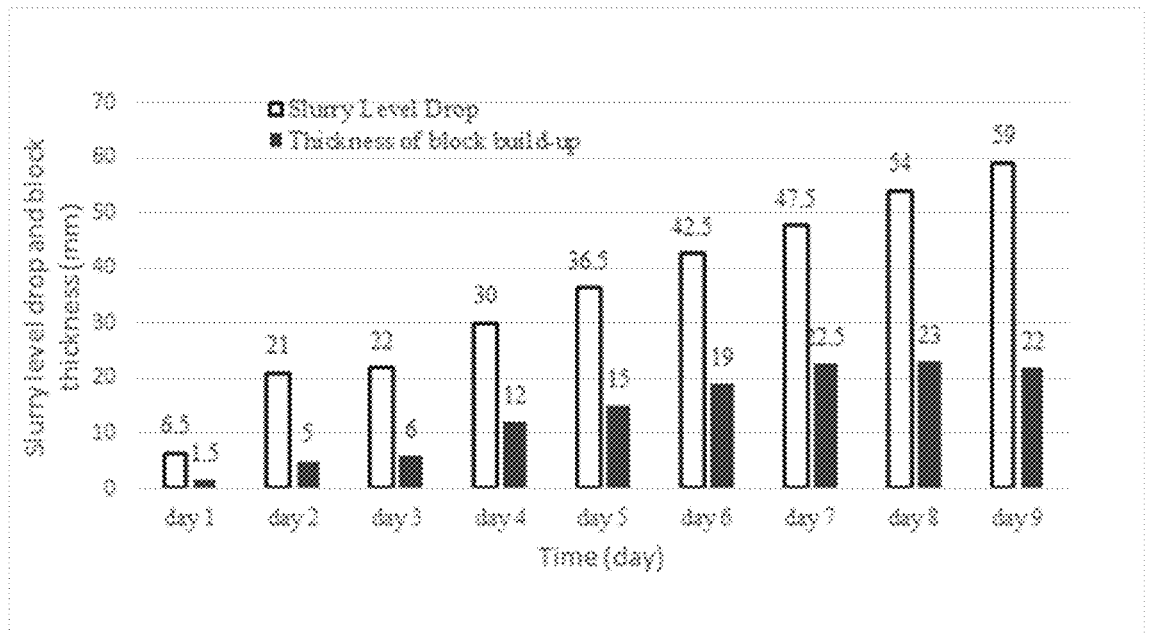

As reported in Table 3, and graphically illustrated in FIG. 9, in Ex. 3, after 14 days the slurry level of the first casting setup (mold wall with 3 mm holes) dropped by 43 mm and a nano-zirconia block with thickness of 24 mm was formed. As reported in Table 3, and graphically illustrated in FIG. 10, in the dual direction casting assembly of Ex. 4 (having 7 mm diameter mold wall holes), the suspension level dropped 59 mm after 9 days, and a 101 mm diameter and 22 mm thick ceramic block was formed, demonstrating faster casting and greater block thickness than the dual direction vacuum casting setup with 3 mm holes.

Example 5

A ceramic body made by dual directional casting of zirconia nano-suspension was tested for fracture toughness.

A 3 mol % yttria-stabilized zirconia nano-suspension having a solid loading of about 55 wt % was obtained from Mel Chemicals. A dual direction (axial and radial) vacuum casting assembly was made substantially according to Example 3, with a mold having a 101 mm diameter cavity and a mold wall with a large rectangular open area (substantially according to FIG. 4A). The mold wall of the casting assembly was almost entirely open after cutting out part of the mold wall adjacent the mold cavity, except for a solid perimeter at the bottom of the mold as shown in FIG. 4A. A porous vertical body surrounded the mold wall openings.

After 19 days of vacuum casting with vacuum pressure of about 27 inHg, a nano-zirconia block 1101 shown in FIG. 11A (top down view) and FIG. 11B (side view) was formed having a diameter of 101 mm, a thicknesses of 75 mm at edge and thickness of 60 mm at center.

Samples were prepared from the block for fracture toughness testing which was measured using micro indentation machine (Model HMV-G21, Shimadzu Inc., Maryland, USA). Test specimen prepared from the cast block were sintered at 1150° C. for 2 hours, until approximately full theoretical density was reached. For testing, 19.61 N of load and 15 second dwell time were used. No crack formation was observed adjacent the indentation. The average fracture toughness value was 11.95 MPa·m$^{1/2}$, as summarized in Table 4. By way of comparison, a pressed micron-sized 3 mol % yttria-stabilized zirconia powder, sintered at 1580° C. to full theoretical density, had an average fracture toughness of 5.01 MPa·m$^{1/2}$, with crack formation at the tip of indentation.

Example 6 Through Example 8

Zirconia ceramic bodies were cast from suspensions prepared from nano-sized yttria-stabilized zirconia powder. Efficiencies of three casting assemblies having varying mold diameters were compared for casting nano-sized zirconia.

Ceramic suspensions were prepared with 3 mol % and 8 mol % yttria-stabilized zirconia nano-sized powders from Inframat Advanced Materials (CT, USA) to make a 4.9 mol % yttria-stabilized zirconia suspension. The solids loading of the suspensions were approximately 40 wt %, and Dolapix CE 64 dispersant in an amount of about 0.75 wt % to the zirconia mass was added. After all the components were mixed by mechanical mixer, the suspension was aggressively milled in the Netzsch Labstar to yield a suspension with an average particle size of 85 nm.

Casting assemblies were arranged as follows. A first casting assembly was prepared substantially according to Example 2, for a single direction casting (axial only) having a mold with no wall openings and a mold cavity diameter of 38 mm. A second casting assembly was prepared substantially according to Example 1 for dual direction (radial and axial) vacuum casting, wherein the mold wall had 3 mm diameter through holes over about 30% of the cavity mold wall surface area. The mold cavity diameter was 38 mm. A third casting setup was prepared substantially according to Examples 3 through 5, having 3 mm diameter through holes in the mold cavity wall and a cavity diameter of 101 mm.

About 225 g of zirconia ceramic suspension was added to the slurry chambers of the first and second casting assemblies. About 1523 g of the ceramic suspension was added to the slurry chamber of the third casting assembly. The initial levels of suspension were marked on the slurry chamber wall of each setup. The suspensions were cast on porous plaster casting substrates prepared by mixing plaster of Paris powder and water in the ratio of 100 g and 70 g, respectively. A vacuum of about 27 in Hg was maintained during the casting process. The suspension was measured daily for 10 days, and the drop in suspension level from the initial mark was recorded. Table 5 and FIG. 12 show change of suspension level over time for 10 (or 11) days for each vacuum casting apparatus.

TABLE 4

Fracture Toughness Values For Sintered Ceramic Bodies Made By Dual Vacuum Casting 3 mol % Yttria-Stabilized Zirconia Nano-Suspension.

| Material System | Indentation Load (N) | $C_1$ (μm) | $C_2$ (μm) | $C_{ave}$ (μm) | $d_1$ (μm) | $d_2$ (μm) | $d_{Ave}$ (μm) | E (GPa) | Calculated Hardness (GPa) | $X_r$ | Calculated Fracture Toughness, $K_{JC}$, (MPa*m$^{1/2}$) |
|---|---|---|---|---|---|---|---|---|---|---|---|
| NANO 3Y | 19.61 | 51.28 | 49.93 | 25.30 | 51.10 | 50.11 | 50.61 | 200 | 14.20 | 0.077 | 11.85 |
| Mel Chemicals | 19.61 | 51.10 | 50.48 | 25.40 | 51.10 | 50.48 | 50.79 | 200 | 14.09 | 0.077 | 11.83 |
| Sintered @ 1150 C. | 19.61 | 51.28 | 50.48 | 25.44 | 51.65 | 50.48 | 51.07 | 200 | 13.94 | 0.078 | 11.87 |
| for 1 hr | 19.61 | 51.83 | 50.48 | 25.58 | 51.83 | 50.48 | 51.16 | 200 | 13.89 | 0.078 | 11.79 |
|  | 19.61 | 50.37 | 50.11 | 25.12 | 50.37 | 50.11 | 50.24 | 200 | 14.40 | 0.076 | 11.90 |
| AVERAGE |  |  |  |  |  |  |  |  | 14.11 |  | 11.85 |
| STDEV |  |  |  |  |  |  |  |  | 0.21 |  | 0.04 |

TABLE 5

Casting Rate Measured Daily For Single and Dual Direction Vacuum Casting Set-ups For 38 mm or 101 mm Diameter Ceramic Bodies From Zirconia Nano-Sized Suspensions.

| Time (day) | Ex. 6. Axial-Only Direction Vacuum (38 mm dia. mold) (suspension drop in mm) | Ex. 7 Dual-Direction Vacuum (38 mm dia. mold) (suspension drop in mm) | Ex. 8 Dual-Direction Vacuum (101 mm dia. mold) (suspension drop in mm) |
|---|---|---|---|
| 1 | 0 | 0 | 17 |
| 2 | 22 | 42 | 34 |
| 3 | 30 | 62 | 49 |
| 4 | 36 | 76 | 62 |
| 5 | 43 | 89 | 73 |
| 6 | 48 | 96.5 | 82 |
| 7 | 53.5 | 111 | 93 |
| 8 | 58 | 120 | 104 |
| 9 | 63 | 136 | 111.5 |
| 10 | 66 | 140 | 121.5 |
| 11 | — | — | 123.5 |

After 10 days, for 38 mm diameter bodies, the suspension level dropped by 140 mm in the dual directional casting apparatus (Ex. 7) compared to 66 mm in the single directional casting apparatus (Ex. 6). Thus, the dual directional casting apparatus having a 38 mm diameter mold (Ex. 7) was more than 2 times faster than the single directional casting apparatus, and it was also faster than the dual direction apparatus with the 101 mm diameter mold (Ex. 8). The nano-sized $ZrO_2$ suspensions of Examples 7 and 8, prepared from nano-sized powders that were processed by milling, provided faster casting for dual direction casting than the commercially available nano-sized $ZrO_2$ suspensions of Examples 1, 3 and 4, above.

Example 9 Through Example 11

Zirconia ceramic bodies were cast from commercially available micron-sized yttria-stabilized zirconia. Efficiencies of three casting apparatus were compared for casting micron-sized zirconia.

A single direction (axial) vacuum casting assembly and two dual direction (axial and radial) vacuum casting assemblies having different size holes (diameters of 3 mm and 7 mm), were compared for casting 101 mm diameter ceramic bodies.

A ceramic suspension comprising 4.9 mol % yttria-stabilized zirconia (micron-size) with solid loading of about 72 wt % and Dolapix CE 64 as dispersing agent was prepared. After all components were mixed by using a mechanical mixer, the suspension was aggressively milled in Netzsch Labstar to make homogeneous suspension and to break down agglomerates.

Figure 13:
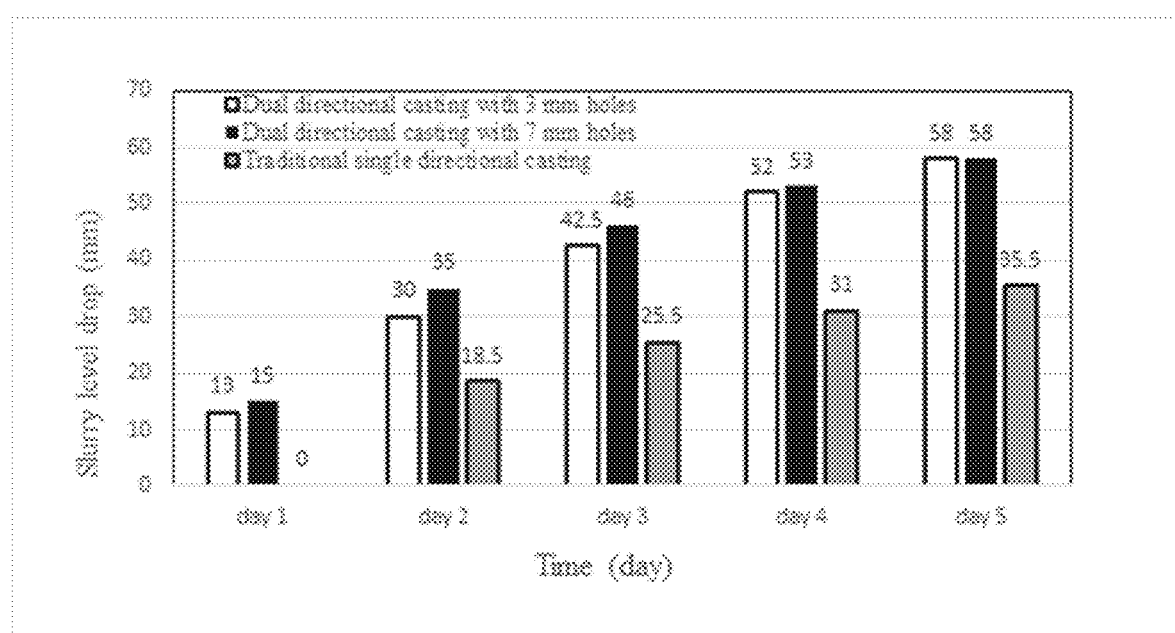

The slurry chambers of the two dual direction vacuum casting setups were each filled with 2500 g of suspension. The single direction (axial) vacuum casting setup was filled with 2400 g of suspension. All three casting setups have mold cavity diameter of 101 mm. Vacuum pressure measuring about 27 inHg was held during the casting process. The initial suspension levels were marked inside of the slurry chambers of all three assemblies. The suspension level drops from the initial marks were measured daily for 5 days, and results are summarized in Table 6 and FIG. 13.

TABLE 6

Casting Rate Measured Daily For Single and Dual Direction Vacuum Casting Set-ups For 101 mm Diameter Ceramic Bodies From Zirconia Micron-Sized Suspensions.

| Time (day) | Ex. 9 Axial-only Direction Vacuum Casting (suspension drop in mm) | Ex. 10 Dual Direction Vacuum Casting (3 mm dia. holes) (suspension drop in mm) | Ex. 11 Dual Direction Vacuum Casting (7 mm dia. holes) (suspension drop in mm) |
|---|---|---|---|
| 1 | N/a | 13 | 15 |
| 2 | 18.5 | 30 | 35 |
| 3 | 25.5 | 42.5 | 46 |
| 4 | 31 | 52 | 53 |
| 5 | 35.5 | 58 | 58 |

Both dual direction vacuum casting assemblies had faster casting rates than the single (axial-only) direction vacuum casting setup. The difference in casting rates between the two dual direction vacuum casting setups was negligible. After 5 days, the suspension level dropped 58 mm in both dual directional casting setups whereas the suspension level dropped 35.5 mm in the single directional casting setup. For micron-sized zirconia ceramic suspensions, casting rates of the dual directional casting setups were 1.6 times faster than the single directional casting setup over 5 days.

Examples 12 and Example 13

Zirconia ceramic bodies were formed from micron-sized yttria-stabilized zirconia ceramic suspension. Efficiencies in single direction (axial) vacuum casting and dual direction vacuum-pressure casting were compared.

A first single-direction apparatus was substantially similar to the apparatus of Example 9, comprising a mold cavity having a 101 mm diameter, wherein the mold walls had no holes or openings through the wall.

A second casting apparatus, suitable for dual direction vacuum-pressure casting, was obtained that was substantially in accordance with Example 3 and 4, except as follows. The walls of the cylinder that comprised the slurry chamber and mold were comprised of 5 mm thick aluminum. The mold cavity diameter was 101 mm, and 3 mm diameter circular openings through the metal mold walls were provided to facilitate radial vacuum. A metal lid was secured to the slurry chamber by screws. In addition to screw holes, the lid had three openings to accommodate a nozzle for delivering the ceramic suspension to the slurry chamber, for introducing air pressure to the slurry chamber, and for a pressure gauge. A porous vertical body surrounded the mold cavity, contacting the metal wall and covering the holes.

A suspension of 4.9 mol % yttria-stabilized zirconia micron-sized zirconia particles was made substantially according to Examples 9-11. 871.5 g of suspension was introduced into the slurry chamber of the first casting apparatus (single direction), and the initial suspension level was marked. The single direction vacuum casting was performed under a vacuum of about 27 inHg, which was applied for 10 hours, over which time the level dropped 13 mm. The weight of the zirconia ceramic that was cast was 513.7 g, To the second dual direction vacuum-pressure casting setup, 1750 g of suspension was introduced into the slurry chamber and the initial suspension level was marked. The slurry was cast under a pressure of 10 psi (20.4 inHg) and vacuum level of 27 inHg. After 10 hours, the ceramic suspension level dropped 31 mm. The weight of the dried cast body was 1012 g.

Example 14 Through Example 21

Zirconia ceramic bodies were cast from a suspension in an adaptable dual-direction, vacuum-pressure casting apparatus, operated under different casting conditions.

An adaptable casting apparatus was made as follows. An upper casting assembly comprised a metal cylinder having top and bottom regions comprising a slurry chamber and a mold, and a metal ring separating the slurry chamber and mold cavity. The mold cavity diameter was 101 mm, and to facilitate radial vacuum, the mold wall had a large open area substantially similar to FIG. 4A, having a height of about 12 mm. The bottom perimeter of the mold had a solid metal band that was approximately 8 mm.

The outer surface of the mold was covered by a plaster, porous vertical body that covered the open area of the mold wall, and vertical channels were made in the porous vertical body. The mold and porous vertical body were surrounded by an impermeable case. A metal lid was secured to the top of the slurry chamber by screws. The lid had three openings that accommodated a nozzle to deliver the ceramic suspension into the slurry chamber, for introducing air pressure into the slurry chamber, and for a pressure gauge. The upper casting assembly was engaged with a lower casting assembly substantially as described in Example 1, and adapted for use with a 101 mm diameter mold.

Radial-only direction vacuum casting was achieve by placing an impermeable casting substrate over the porous support body, blocking vacuum in the axial direction and preventing flow of suspension liquid through the bottom of the mold. Axial-only direction vacuum casting was achieved by placing an impermeable rubber gasket around the bottom perimeter of the porous support body to block vacuum through the channels preventing pressure drop adjacent the porous vertical body.

To compare the efficiencies of different casting operations, the dual direction vacuum-pressure casting setup was operated at different conditions, and the results are summarized at Table 7. A suspension of micron sized 4.9 mol % yttria-stabilized $ZrO_2$, prepared according to Examples 9 through 11, was used to cast $ZrO_2$. Zirconia disc blocks were formed in a mold having a mold diameter of 101 mm and mold thickness of 21 mm. The weight and volume of cast blocks were measured. The percentage of cast zirconia was calculated for each block after comparing the volume of the mold cavity and volume of the $ZrO_2$ cast.

TABLE 7

Amount Of Zirconia Cast Under Multiple Conditions Using a Dual Direction Vacuum - Positive Pressure Casting Apparatus.

| | Casting condition | | | Cast Zirconia | |
|---|---|---|---|---|---|
| Ex. No. | Vacuum Direction | Pressure (psi) | Time (hr) | Weight (g) | Percentage (%) |
| 14 | Radial | 0 | 3 | 156 | 24 |
| 15 | Axial | 0 | 3 | 258 | 40 |
| 16 | Axial - Radial | 0 | 3 | 339 | 52 |
| 17 | Axial - Radial | 40 | 3 | 519 | 80 |
| 18 | Axial - Radial | 40 | 4 | 628 | 97 |
| 19 | Axial - Radial | 40 | 5 | 632 | 98 |
| 20 | Axial - Radial | 60 | 3 | 573 | 89 |
| 21 | Axial - Radial | 80 | 3 | 627 | 97 |

The average intensity of vacuum during casting was about 27 inHg. After casting for 3 hours under vacuum without application of pressure, the volume percentages (based on the volume of the mold cavity) of cast zirconia suspension was 24% for application of vacuum in the radial direction, 40% for vacuum in the axial direction, and 52% for application of vacuum in both axial and radial directions.

With application of axial vacuum and radial vacuum of 27 inHg, after three hours, the volume percentage (based on the volume of the mold cavity) of cast zirconia was 52% with no application of pressure, 80% with the application of 40 psi, 89% with the application of 60 psi, and 97% with the application of 80 psi.

With application of axial vacuum and radial vacuum of about 27 inHg and application of 40 psi pressure through the slurry chamber, the volume percentage of $ZrO_2$ cast was 80% after casting for 3 hours, 97% after casting for 4 hours, and 98% after casting for 5 hours.

We claim:

1. A method for casting a solid ceramic block from a ceramic suspension by a dual direction vacuum—pressure casting process, comprising:
   a. providing a casting apparatus that comprises
      i. an upper casting assembly comprising
         a. a cylinder comprising
            1. A slurry chamber,
            2. a mold comprising a mold wall surrounding a mold cavity and mold wall openings that extend through a full thickness of the mold wall, and
            3. an impermeable ring between the slurry chamber and the mold, and
         b. a porous vertical body that covers the outer surface of the mold; and
      ii. a lower casting assembly comprising
         a. a porous casting substrate and
         b. a support body below the porous casting substrate,
      wherein a bottom end of the upper casting assembly is in communication with the porous casting substrate of the lower casting assembly when the upper and lower casting assemblies are assembled to form the casting apparatus;
   b. delivering a ceramic suspension comprising yttria-stabilized zirconia suspended in a liquid through the slurry chamber into the mold;
   c. applying at least one of i) a vacuum and ii) a positive pressure to the casting apparatus;
   d. discharging liquid from the ceramic suspension through at least one of i) the mold wall openings and ii) the porous casting substrate;
   e. casting the suspension on the casting substrate and the mold wall;
   f. consolidating ceramic particles within the mold forming a ceramic green body;

g. separating the porous casting substrate from the mold and ejecting the resulting ceramic green body from the mold.

2. The method of claim 1, wherein the impermeable ring partially separates the mold cavity and the slurry chamber.

3. The method of claim 1, wherein the porous vertical body comprises a gap and the porous support body comprises vertical channels that align with the gap when the upper and lower casting assemblies are assembled to form the casting apparatus.

4. The method of claim 1, wherein the bottom end of the upper casting assembly fits within a recess in the porous casting substrate.

5. The method of claim 4, wherein the bottom end of the upper casting assembly comprises a solid band of impermeable material around the perimeter of the bottom end of the upper casting assembly.

6. The method of claim 1, wherein the casting apparatus further comprises an impermeable component adjacent the porous casting substrate that blocks discharge of the suspension liquid through the support body.

7. The method of claim 6, wherein the impermeable ring is comprised of a metal or plastic material that resists penetration of the suspension liquid during the casting process.

8. The method of claim 1, comprising applying a vacuum to the casting apparatus, and discharging liquid from the ceramic suspension through the mold wall openings and the porous casting substrate.

9. The method of claim 1, comprising applying a vacuum to the casting apparatus, discharging liquid from the ceramic suspension through the mold wall openings and blocking the flow of liquid through the porous casting substrate.

10. The method of claim 1, comprising applying a positive pressure to the casting apparatus, and discharging liquid from the ceramic suspension through the mold wall openings and the porous casting substrate.

11. The method of claim 1, comprising applying a positive pressure to the casting apparatus, discharging liquid from the ceramic suspension through the mold wall openings and blocking the flow of liquid through the porous casting substrate.

12. The method of claim 1, comprising applying a vacuum and applying a positive pressure to the casting apparatus, and discharging liquid from the ceramic suspension through the mold wall openings and the porous casting substrate.

13. The method of claim 1, comprising applying a vacuum and applying a positive pressure to the casting apparatus, and discharging liquid from the ceramic suspension through the mold wall openings and blocking the flow of liquid through the porous casting substrate.

14. The method of claim 1, wherein the upper casting assembly comprises an upper case comprised of an impermeable material to maintain vacuum or positive pressure within the casting apparatus during the casting process.

15. The method of claim 1, wherein the lower casting assembly comprises a lower case comprised of an impermeable material to maintain vacuum or positive pressure within the casting apparatus during the casting process.

16. The method of claim 1, wherein the porous vertical body fills the mold wall openings.

17. The method of claim 1, wherein the porous vertical body covers an external surface of the mold wall between the impermeable ring and an impermeable solid band at a bottom perimeter of the mold wall.

18. The method of claim 1, wherein the support body is comprised of a porous material.

19. The method of claim 1, wherein the cylinder is comprised of metal or plastic that resists penetration by the suspension liquid during the casting process.

20. The method of claim 1, wherein the mold wall comprises a plurality of circular or rectangular mold wall openings having a diameter between 1 mm and 15 mm.

21. The method of claim 1, wherein the area of the mold wall openings comprises between 1% and 70% of the surface area of the mold wall.

22. The method of claim 1, wherein the area of the mold wall openings comprises between 40% and 95% of the surface area of the mold wall.

\* \* \* \* \*